US012776886B2

(12) United States Patent
Gao et al.

(10) Patent No.: US 12,776,886 B2
(45) Date of Patent: Oct. 27, 2026

(54) SYSTEMS AND METHODS FOR BEAM MEASUREMENT AND REPORTING IN PREDICTABLE MOBILITY SCENARIOS

(71) Applicant: ZTE CORPORATION, Shenzhen (CN)

(72) Inventors: Bo Gao, Shenzhen (CN); Zhaohua Lu, Shenzhen (CN); Wenjun Yan, Shenzhen (CN); Zhen He, Shenzhen (CN); Shijia Shao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 566 days.

(21) Appl. No.: 18/201,949

(22) Filed: May 25, 2023

(65) Prior Publication Data

US 2023/0327736 A1 Oct. 12, 2023

Related U.S. Application Data

(63) Continuation of application No. PCT/CN2021/072023, filed on Jan. 15, 2021.

(51) Int. Cl.
*H04L 5/00* (2006.01)
*H04B 7/06* (2006.01)
*H04W 72/20* (2023.01)

(52) U.S. Cl.
CPC ......... *H04L 5/0078* (2013.01); *H04B 7/0691* (2013.01); *H04W 72/20* (2023.01)

(58) Field of Classification Search
CPC ... H04L 5/0078; H04L 5/0053; H04L 5/0094; H04L 1/0026; H04L 5/0091; H04L 5/0048; H04B 7/0691; H04B 7/0404; H04B 7/06952; H04W 72/20; H04W 16/28; H04W 72/23; H04W 72/231; H04W 24/08; H04W 24/10; H04W 56/001; H04W 72/0446; H04W 72/232
See application file for complete search history.

(56) References Cited

U.S. PATENT DOCUMENTS

2017/0230096 A1* 8/2017 Dinan .................. H04B 7/0417

FOREIGN PATENT DOCUMENTS

| | | | | |
|---|---|---|---|---|
| CN | 109565320 | A | 4/2019 | |
| KR | 10-2020-0096763 | A | 8/2020 | |
| WO | WO-2018183995 | A1 * | 10/2018 | ............ H04W 72/23 |
| WO | WO-2018/232294 | A1 | 12/2018 | |
| WO | WO-2019/031058 | A1 | 2/2019 | |

(Continued)

OTHER PUBLICATIONS

Apple Inc., "On Further MIMO Enhancement" 3GPP TSG RAN WG1 #100b, R1-2002342, Apr. 30, 2020, e-Meeting (8 pages).

(Continued)

*Primary Examiner* — Charles C Jiang
*Assistant Examiner* — Rachel Elizabeth Cerlanek
(74) *Attorney, Agent, or Firm* — Foley & Lardner LLP

(57) ABSTRACT

Presented are systems and methods for beam measurement and reporting in predictable mobility scenarios. A wireless communication device may receive a signaling to associate a timing parameter with a transmission parameter corresponding to an information element from a wireless communication node. The wireless communication node may communicate the information element according to the timing parameter and the transmission parameter.

19 Claims, 13 Drawing Sheets

(56) References Cited

FOREIGN PATENT DOCUMENTS

| | | | | |
|---|---|---|---|---|
| WO | WO-2019/047953 A1 | | 3/2019 | |
| WO | WO-2019099659 A1 | * | 5/2019 | ............ H04W 72/53 |

OTHER PUBLICATIONS

Intel Corporation, 3GPP TSG RAN WG1 Meeting #102-e, R1-2007244, Aug. 28, 2020, e-Meeting (38 pages).
Intel Corporation, "Summary#3 of AI: 8.1.2.4 Enhancements on HST-SFN deployment", 3GPP TSG RAN WG1 Meeting #102-e, R12007315, Aug. 28, 2020, e-Meeting (42 pages).
International Search Report and Written Opinion for PCT Appl. No PCT/CN2021/072023, mailed Sep. 30, 2021 (8 pages).
Lenovo et al., "Enhancements on Multi-beam Operation", 3GPP TSG RAN WG1#103-e, R1-2008910, Nov. 13, 2020, e-Meeting (10 pages).
LG Electronics, "Enhancements on beam management for multi-TRP" 3GPP TSG RAN WG1 #103-e, R1-2008576, Nov. 13, 2020, e-Meeting (7 pages).
Moderator (Samsung), "Moderator summary#3 for multi-beam enhancement", 3GPP TSG RAN WG1 #103-e, R1-2009574, Nov. 13, 2020, e-Meeting (21 pages).
Moderator (Samsung), "Moderator summary#4 for multi-beam enhancement", 3GPP TSG RAN WG1 #103-e, R1-2009715, Nov. 13, 2020, e-Meeting (16 pages).
Moderator (Samsung), "Moderator summary#5 for multi-beam enhancement", 3GPP TSG RAN WG1 #103-e, R1-2009749, Nov. 13, 2020, e-Meeting (12 pages).
NTT Docomo, Inc, "Discussion on HST-SFN deployment", 3GPP TSG RAN WG1 #102-e, R1-2006722, Aug. 28, 2020, e-Meeting (6 pages).
NTT Docomo, Inc, "Discussion on multi-beam operation", 3GPP TSG RAN WG1 #103-e, R1-2009174, Nov. 13, 2020, e-Meeting (22 pages).
Samsung, "Multi-beam enhancements" 3GPP TSG RAN WG1 #103-e, R1-2008148, Nov. 13, 2020, e-Meeting (20 pages).
Xiaomi, "Enhancements on multi-beam operation", 3GPP TSG RAN WG1 #102-e, R1-2006540, Aug. 28, 2020, e-Meeting (5 pages).
Extended European Search Report on EP Appl No. 21918520.4, dated Nov. 30, 2023 (13 pages).
Huawei et al., "Enhancements on multi-beam operation in Rel-17", 3GPP TSG RAN WG1 Meeting #103-e, R1-2007586, Nov. 13, 2020, E-meeting (11 pages).
Office Action for KR Appl. No. 10-2023-7018388, dated Jul. 11, 2025 (with English translation, 6 pages).
Communication pursuant to Article 94(3) EPC on EP Appl. No. 21918520.4 dated Feb. 9, 2026 (17 pages).
Notice of Final Rejection on KR Appl. No. 10-2023-7018388 dated Mar. 11, 2026 (8 pages).

* cited by examiner

300

400

600

700

800

1200

SYSTEMS AND METHODS FOR BEAM MEASUREMENT AND REPORTING IN PREDICTABLE MOBILITY SCENARIOS

CROSS-REFERENCE TO RELATED APPLICATION

This application claims the benefit of priority under 35 U.S.C. § 120 as a continuation of International Patent Application No. PCT/CN2021/072023, filed on Jan. 15, 2021, the disclosure of which is incorporated herein by reference in its entirety.

TECHNICAL FIELD

The disclosure relates generally to wireless communications, including but not limited to systems and methods for beam measurement and reporting in predictable mobility scenarios.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a signaling to associate a timing parameter with a transmission parameter corresponding to an information element from a wireless communication node. The wireless communication node may communicate the information element according to the timing parameter and the transmission parameter.

In some embodiments, the information element may comprise a physical downlink control channel (PDCCH), a physical downlink shared channel (PDSCH), a physical uplink control channel (PUCCH), a physical uplink shared channel (PUSCH), or a reference signal (RS). In some embodiments, the signaling may comprise a radio resource control (RRC) signaling, a downlink control information (DCI) signaling, or a medium access control control element (MAC CE) signaling. In some embodiments, the transmission parameter may comprise at least one of: a beam state, group information, a repetition parameter, a transmission period, a transmission offset, or an uplink (UL) power control parameter. In some embodiments, the timing parameter may be used to determine a time unit, an effective time, a starting time or an ending time for applying the transmission parameter. In some embodiments, the timing parameter and a corresponding scaling factor may be used to determine a time unit, an effective time, a starting time or an ending time for applying the transmission parameter. In some embodiments, the timing parameter and the corresponding scaling factor may be indicated by the signaling or another signaling. In some embodiments, the another signaling may comprise a radio resource control (RRC) signaling, a downlink control information (DCI) signaling, or a medium access control control element (MAC CE) signaling.

In some embodiments, the time unit, effective time, starting time or ending time may be determined according to a function of the timing parameter multiplied by the corresponding scaling factor. In some embodiments, the function may comprise at least one of a ceil, floor, or round function. In some embodiments, the timing parameter may comprise at least one of: a time stamp, a time unit index, a time-domain period, a time-domain interval, or a time-domain offset. In some embodiments, the time-domain offset may comprise at least one of: a time-domain offset for a starting time, or a time-domain offset for an ending time. In some embodiments, the timing parameter may comprises a list of timing parameters. In some embodiments, the transmission parameter may comprise a list of transmission parameters. In some embodiments, a mapping between two adjacent or associated transmission parameters in the list of transmission parameters, and a timing parameter from the list of timing parameters, may be determined. In some embodiments, the information element may comprise a plurality of information elements. In some embodiments, the transmission parameter may comprises a list of transmission parameters. In some embodiments, each transmission parameter in the list of transmission parameters may be applied to a respective one of the plurality of information elements in an order according to the timing parameter. In some embodiments, the information element may comprise a plurality of information elements. In some embodiments, the timing parameter may comprise a list of time-domain intervals, and the transmission parameter comprises a list of beam states. In some embodiments, each beam state in the list of beam states may be applied to a respective one of the plurality of information elements in an order according to the list of time-domain intervals and a corresponding scaling factor.

In some embodiments, the timing parameter may comprise a time-domain period and a time-domain offset. In some embodiments, the transmission parameter may comprise a list of beam states. In some embodiments, each beam state in the list of beam states may be applied to the information element in an order according to the time-domain period and time-domain offset. In some embodiments, the time-domain period and the time-domain offset may be joint coded in a single parameter. In some embodiments, the information element may comprise a plurality of information elements. In some embodiments, a different timing parameter may be associated with each of the information elements. In some embodiments, receiving the signaling to associate the timing parameter with the transmission parameter corresponding to the information element may comprise receiving the signaling to configure a plurality of parameter sets each associated with or comprising a respective timing parameter and a respective transmission parameter. In some embodiments, receiving the signaling to associate the timing parameter with the transmission parameter corresponding to the information element may comprise receiving the signaling or another signaling to associate the information element with one or more of the plurality of parameter sets.

In some embodiments, the transmission parameter may comprise a beam state. In some embodiments, receiving the signaling to associate the timing parameter with the transmission parameter corresponding to the information element may comprise receiving the signaling to associate the beam state with a parameter set. In some embodiments, the parameter set may comprise at least one of: the timing parameter, group information, a repetition parameter, a transmission period, a transmission offset, or an uplink (UL) power control parameter. In some embodiments, if the signaling indicates the beam state for the information element, the parameter set may be applied to the information element. In some embodiments, the wireless communication device may receive the signaling from the wireless communication node to activate the transmission parameter and the timing parameter for the information element. In some embodiments, the signaling may be configured to activate the transmission parameter for the information element and to provide the timing parameter. In some embodiments, the timing parameter may comprise at least one of: a time-domain offset or an additional offset, for the information element, the information element comprising a semi-persistent RS.

In some embodiments, the signaling may be configured to indicate the transmission parameter for the information element. In some embodiments, a time unit of the information element may be determined according to the timing parameter comprising a transmission offset associated with the transmission parameter. In some embodiments, the transmission parameter may comprise a beam state that is associated with the timing parameter comprising at least one of: the transmission offset or a transmission period, that is applied to the information element. In some embodiments, the wireless communication device may determine at least one of: a repetition parameter corresponding to the information element according to an associated timing parameter or an indication by a medium access control control element (MAC-CE) or downlink control information (DCI) signaling, an uplink (UL) power control parameter corresponding to the information element according to the associated timing parameter, or at least one of a transmission period or a transmission offset corresponding to the information element, according to the MAC CE or DCI signaling.

In some embodiments, the RS may comprise or correspond to at least one of: a RS resource, a RS resource set, a RS resource setting, a reporting configuration or a triggering state. In some embodiments, a number of RS resources in the RS resource set or a number of RS resources to be measured or reported in the RS resource set, may be associated with the timing parameter or determined by the signaling comprising a medium access control control element (MAC-CE) or downlink control information (DCI) signaling. In some embodiments, a time unit of a transmission of the RS, or of a transmission carrying channel state information, may be determined according to the timing parameter. In some embodiments, the triggering state may be associated with multiple reporting configurations each comprising the RS resource set or the RS resource setting. In some embodiments, the triggering state may be associated with the timing parameter and the multiple reporting configurations each comprising a RS resource setting. In some embodiments, the timing parameter may be applied to at least one of: a transmission of the channel state information and a transmission of the RS.

In some embodiments, the triggering state may be indicated by the MAC CE or DCI signaling. In some embodiments, the RS resource sets corresponding to the multiple reporting configurations may be transmitted in an order according to the timing parameter. In some embodiments, the timing parameter may comprise a list of time parameters, each corresponding to one of the multiple reporting configurations, the corresponding RS resources or the corresponding RS resource sets. In some embodiments, the RS may correspond to a plurality of transmission occasions. In some embodiments, a time unit of each of the plurality of transmission occasions may be determined according to the timing parameter comprising a first time stamp, a first time unit index, a first time-domain period, a first time-domain interval, or a first time-domain offset. In some embodiments, the RS may correspond to a plurality of transmissions of channel state information. In some embodiments, a time unit of each of the plurality of transmissions may be determined according to the timing parameter comprising a second time stamp, a second time unit index, a second time-domain period, a second time-domain interval, or a second time-domain offset.

In some embodiments, a list of one or more beam states for each RS resource in a RS resource set for each of the transmission occasions may be configured by the wireless communication node. In some embodiments, the transmission parameter may comprise a beam state. In some embodiments, the signaling or another signaling may indicate the beam state. In some embodiments, a time unit of the beam state may be determined according to the timing parameter. In some embodiments, the timing parameter may include a time stamp associated with the beam state or activated by a medium access control control element (MAC-CE) or downlink control information (DCI) signaling. In some embodiments, the beam state may be applied to at least one of a downlink signal or an uplink signal. In some embodiments, the beam state may be determined according to a prediction model.

In some embodiments, the transmission parameter may comprise a list of beam states. In some embodiments, the signaling may indicate at least one of: the list of beam states, each applied in an order or a cyclic sequence, a first beam state to be applied from the list of beam states, a scaling factor of the timing parameter, or a timing parameter corresponding to a specific beam state from the list of beam states. In some embodiments, the list of beam states may comprise X beam states. In some embodiments, there may be a time domain interval between beam state (i mod X) and beam state ((i+1) mod X) of the X beam states, where X is an integer and i is an integer. In some embodiments, a time domain interval for beam state (i mod X) may be passed. In some embodiments, once a time domain interval for beam state (i mod X) is passed, a beam state comprising beam state ((i+1) mod X) may be applied. In some embodiments, the beam state may comprise a transmission configuration indicator (TCI) state, a quasi-co-location (QCL) state, spatial relation information, a reference signal (RS), a spatial filter or pre-coding information.

At least one aspect is directed to a system, method, apparatus, or a computer-readable medium. A wireless communication node may transmit a signaling to associate a timing parameter with a transmission parameter corresponding to an information element to a wireless communication device. The wireless communication node may cause the wireless communication device to communicate the information element according to the timing parameter and the transmission parameter.

The systems and methods presented herein describe a novel/comprehensive approach for predictable beam transitions in a high mobility scenario. The systems and methods may describe a novel approach for designing/configuring a corresponding RS configuration to enable said approach for predictable beam transitions. Furthermore, the systems and methods presented herein may cause a reduction/decrease in RS overhead for beam tracking and/or latency of a beam indication (e.g., reducing by at least 25%, 35%, 45%, or other percent). Based on the results for future beam transitions, a beam state and/or CSI measurement/reporting can be scheduled in advance by using specific time stamps. Furthermore, a method for initializing a package of one or more instances of beam measurements/reports is presented herein. For each beam measurement and/or report instance, the wireless communication device may be provided with respective transmission parameters (e.g., beam states), timing parameters, and/or additional transmission offsets (e.g., for periodic and/or semi-persistent RS) to determine an effective time of the beam state.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
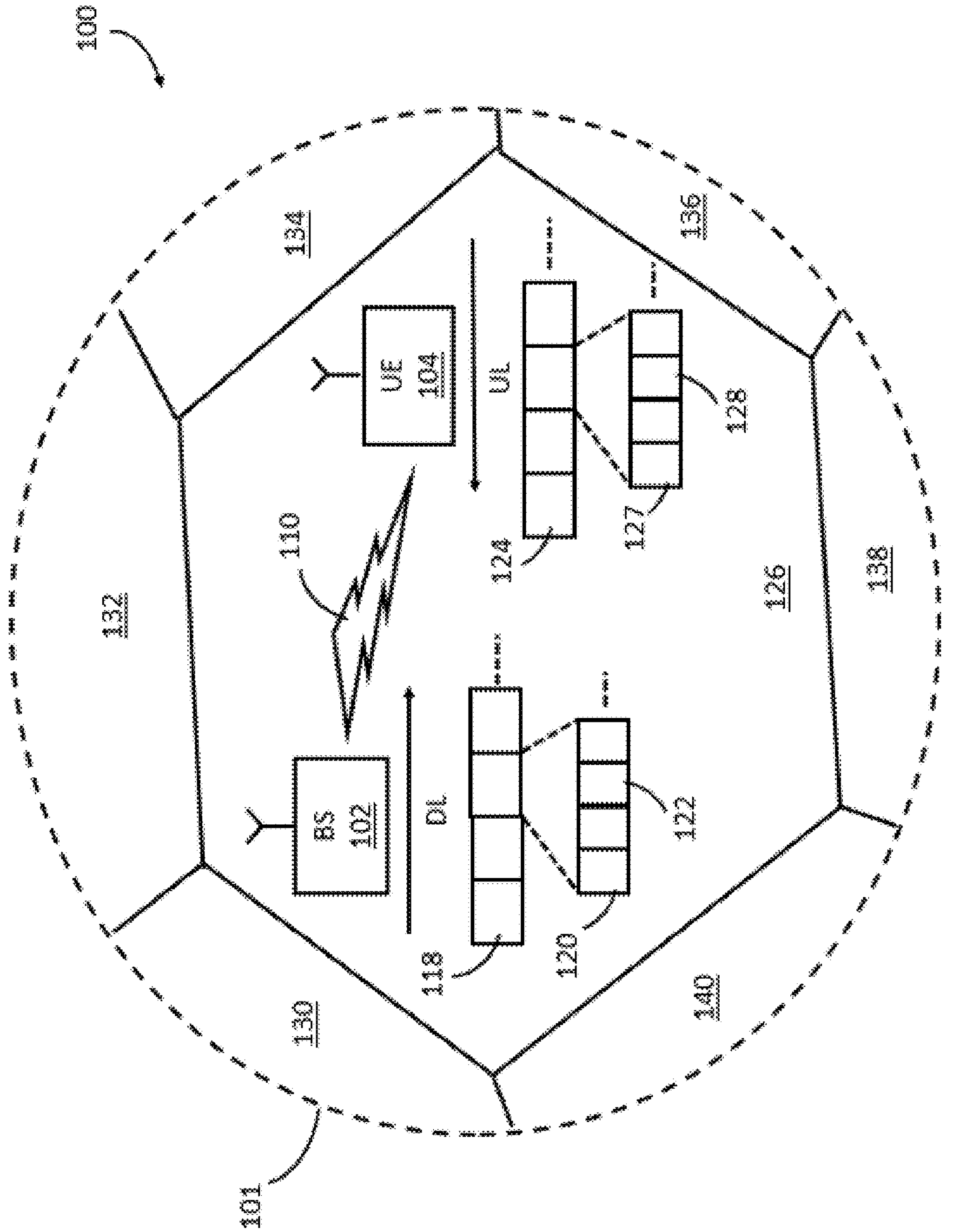
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
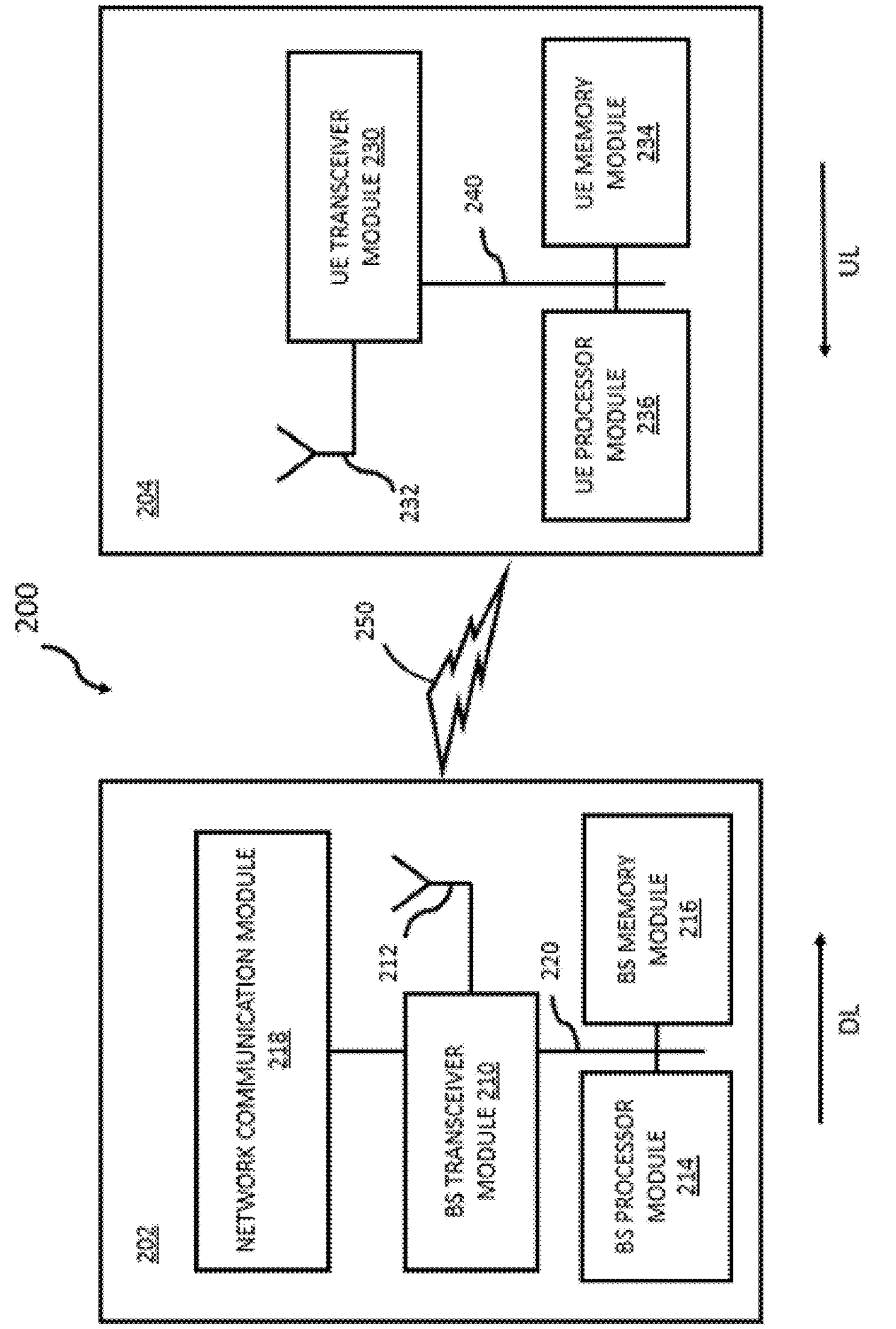
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Beam Measurement and Reporting in Predictable Mobility Scenarios In certain systems (e.g., 5G new radio (NR) and/or other systems), mobile communication methods/procedures may use/implement/enable analog beam-forming techniques. Analog beam-forming may facilitate/increase/enhance the robustness of high-frequency communications and/or processes. In some embodiments, a quasi co-location (QCL) state and/or transmission configuration indicator (TCI) state (or beam state) may support/enable/facilitate beam indication for one or more types of channels and/or signals. For example, a QCL state and/or TCI state may support beam indication for downlink (DL) control channels (e.g., physical downlink control channel (PDCCH) and/or other channels), DL data channels (e.g., physical downlink shared channel (PDSCH) and/or other channels), and/or reference signals (e.g., channel state information reference signaling (CSI-RS) and/or other types of signals). In some embodiments, spatial relation information (e.g., higher layer parameters, such as spatialRelationInfo, and/or other parameters) may support/enable/facilitate beam indication for one or more types of channels and/or signals. For instance, spatial relation information (and/or other information) may support beam indication for uplink (UL) control channels (e.g., physical uplink control channel (PUCCH)), reference signals (e.g., sounding reference signal (SRS)), and/or other types of channels/signals. For UL data channels (e.g., physical uplink shared channel (PUSCH) and/or other channels), beam indication can be achieved/implemented/enabled by mapping one or more SRS resources and/or one or more ports of an UL data channel. A wireless communication node (e.g., a ground terminal, a base station, a gNB, an eNB, or a serving node) may indicate/specify the one or more SRS resources. Therefore, a configuration of the beam for an UL data channel (or other channels) may be derived/determined/obtained by using the spatial relation information. The spatial relation information can be associated/related/linked with one or more SRS resources and/or ports of the UL data channel.

Current solutions, such as 5G NR solutions, may provide flexible configurations that are applicable to different/multiple scenarios. However, current solutions may be less effective in high mobility scenarios with a wireless communication device (e.g., a UE, a terminal, or a served node). For instance, in a high mobility scenario, a wireless communication device may travel/move at an increased speed (e.g., 300 Km/h or other speeds). Therefore, the corresponding beam dwelling time may be reduced/smaller (e.g., ~10 ms or other time instances). A reduction in the corresponding beam dwelling time may cause an increase in reference signal (RS) overhead for beam tracking and/or a larger latency for beam indication in wireless communication device mobility. For instance, in a high speed train (HST) scenario (e.g., a speed of 500 km/h in a worst case scenario), the beam dwelling time may be as small as 7 ms. If the period of beam tracking is set to 5 ms, the RS overhead for 50 and/or 100 wireless communication devices can be up to 80.36% and 160.71% (or other percentages). As a result, beam tracking may occupy/use a majority of the resources.

In certain scenarios (e.g., HST scenario and/or other scenarios), the movement or trajectory of the wireless communication device may be stable/established/predictable. For instance, the wireless communication device may move/traverse along a high way and/or railway of a HST. In certain locations (e.g., in China), most rails are paved on viaducts and/or in rural areas, where the wireless channels are mostly line-of-sight (LOS). As a result, the position information of one or more trains can be used as a key reference to determine/calculate/identify the coarse direction(s) of one or more beams. The systems and methods presented herein include a novel approach for beam measurement and/or reporting based on (or according to) the coarse direction(s) of the beam(s). The novel approach may enable predictable beam management (e.g., beam transition). The system and methods presented herein may consider/contemplate/address one or more of the following issues/challenges:

1) The framework of RS configuration can be reconsidered in order to achieve/enable fine synchronization of beam transition predictions (e.g., beam switching) in a given period of time (e.g., 1 second or other time instances) along a predictable/stable trajectory. The beam state, channel state information (CSI) measurement and/or beam reporting of further/future beam transitions can be scheduled in advance with specific time stamps based on (or according to) the results.

2) In a high mobility scenario/case (e.g., involving a high way and/or HST), neighbouring/adjacent wireless communication devices may be in a same/corresponding railway carriage, long-distance bus and/or group of cars. Therefore, the RS for fine synchronization of beam transitions can be shared with the neighbouring/ adjacent wireless communication devices (e.g., adjacent to each other) to save/reduce/decrease RS overhead.

3) In a high mobility scenario with a wireless communication device (e.g., UE high mobility scenario), frequent reconfiguration and triggering/initialization of beam reporting may increase signaling overhead. Therefore, certain methods (e.g., AI based methods) of predictable beam management may consider/contemplate initializing a package of multiple instances of beam measurements, one of which may correspond to a respective transmission configuration indicator (TCI)/ spatial relation configuration. The certain methods may include techniques/approaches for refining/improving/ fine-tuning the configuration of aperiodic and/or periodic reference signals (RSs) in different/separate instances.

In certain systems, the use of high frequency resources may induce/produce/cause a considerable propagation loss. Therefore, wide and/or ultra-wide spectrum resources may pose/introduce/cause noticeable challenges (e.g., due to propagation loss). In some embodiments, certain technologies/techniques may achieve/cause beam alignment and/or obtain/cause sufficient antenna gain. For example, antenna arrays and/or beam-forming training techniques that use massive multiple-input multiple-output (MIMO) (e.g., up to 1024 antenna elements for one node) may achieve beam alignment and/or sufficient antenna gain. In some embodiments, analog phase shifters may be used to implement/ enable mmWave beam-forming. Using analog phase shifters may result in a low cost of implementation with the benefits of using antenna arrays. If analog phase shifters are used (e.g., to implement mmWave beam-forming), the number of controllable phases may be finite/defined/restricted. In some embodiments, the use of analog phase shifters may place/ cause one or more constant modulus constraints on the analog phase shifters. Given a set of one or more pre-specified beam patterns, the goal/target of variable-phase-shift-based beamforming (BF) training may correspond to identifying/determining the optimum beam pattern for subsequent data transmissions. The identified beam pattern may apply to one or more scenarios with one transmit receive point (TRP) and/or one panel (e.g., a UE with one panel).

Figure 3:
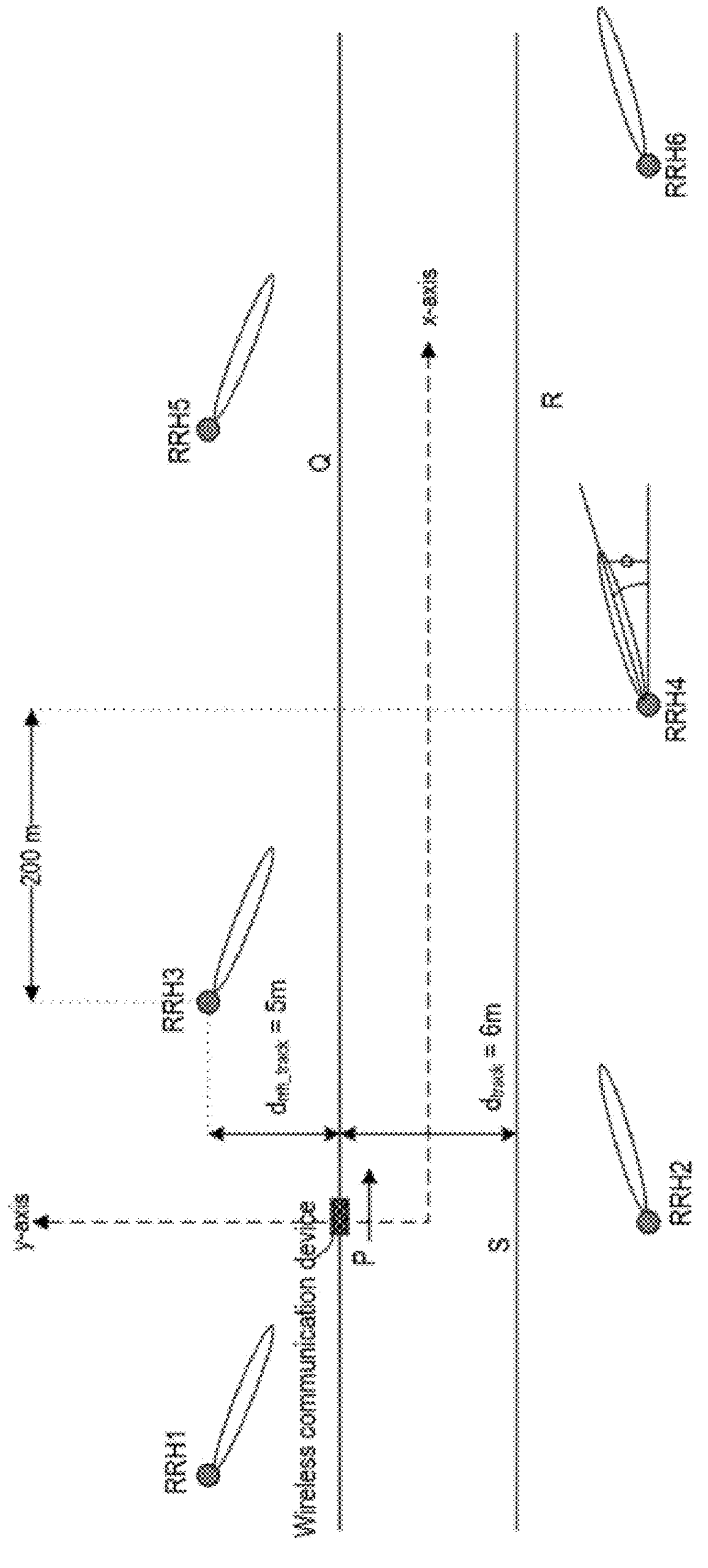
FIG. 3 illustrates example scenarios with a high-speed vehicle and one or more remote radio heads (RRHs), in accordance with some embodiments of the present disclosure.

Referring now to FIG. 3, depicted is an example scenario 300 with a high-speed vehicle (e.g., a train) and one or more remote radio heads (RRHs), e.g., transmit receive points (TRPs). The example scenario may include six (or other numbers) RRHs (e.g., RRH1, RRH2, RRH3, RRH4, RRH5, RRH6, and/or other RRHs) and/or a wireless communication device with at least three (or other numbers) panels (e.g., a right panel, a top panel, and/or a left panel in a phone). The distance between two RRHs (e.g., RRH3 and RRH4) may be 200 meters (or other numbers), while the distance between the railway of the train (e.g., UE1) and at least one RRH (drrh_track) may be 5 meters (or other numbers). One or more RRHs may correspond to a same cell (e.g., save handover procedure), which produces/generates/ emulates a long narrow cell along the railway. One or more TRPs may be deployed alongside a highway in an example scenario of a vehicle in the highway. In traditional beam management, beam tracking (or beam refinement) may be specific to a wireless communication device. Beam tracking (or beam refinement) can be wireless communication device specific because of the difficulty in guaranteeing that neighbouring/adjacent wireless communication devices (e.g., neighbouring in position) move together/jointly/correspondingly (e.g., with high probability). However, in a high mobility scenario (e.g., involving a highway and/or high-speed train), neighbouring/adjacent wireless communication devices may be in a same railway carriage, a same long-distance bus and/or a same group of cars.

Figure 4:
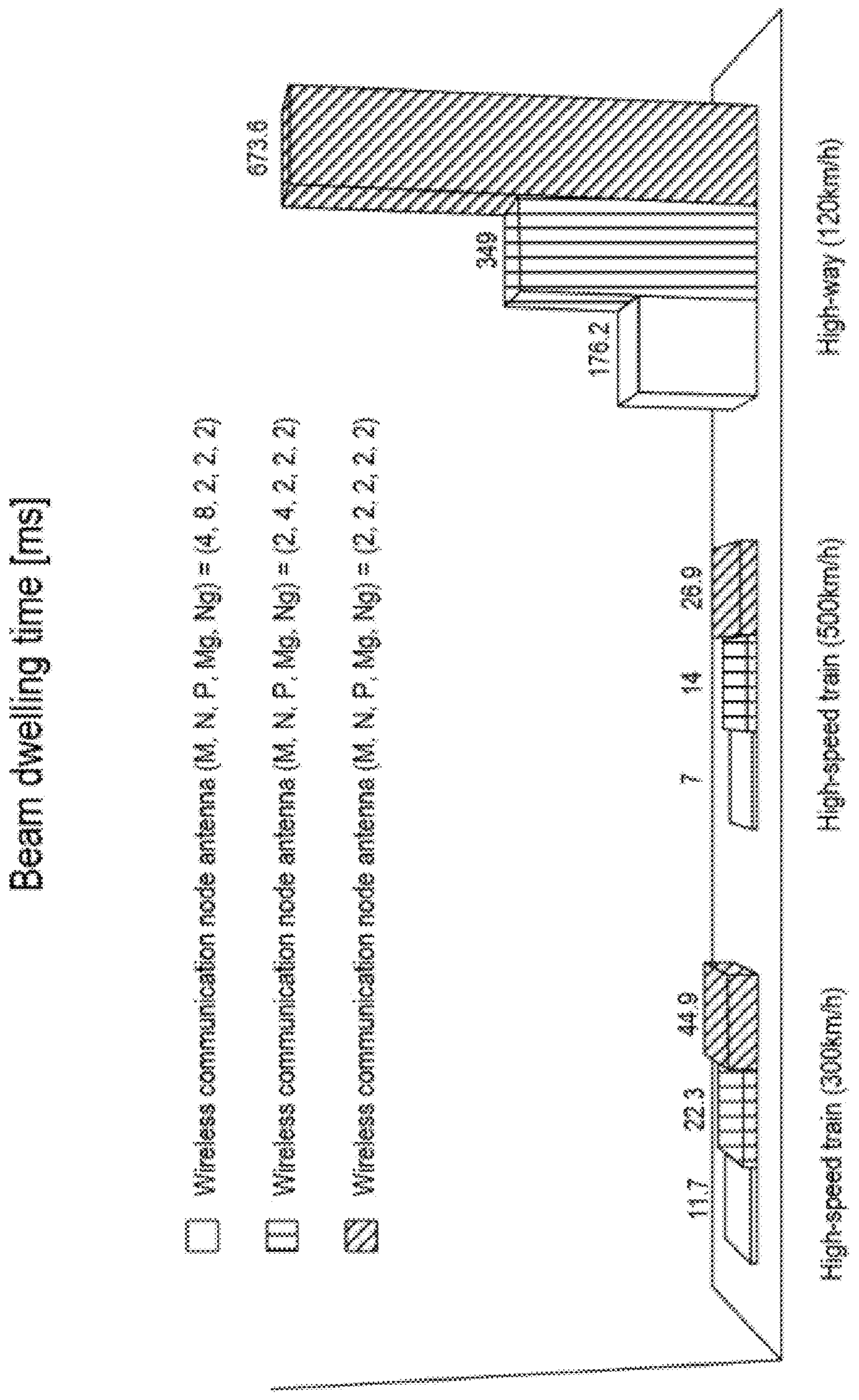
FIG. 4 illustrates example measurements of beam dwelling time for a given wireless communication node antenna configuration, in accordance with some embodiments of the present disclosure.

Referring now to FIG. 4, depicted are example measurements 400 of beam dwelling time for a given wireless communication node (e.g., gNB) antenna configuration. The beam dwelling time of the wireless communication node may include a beam dwelling time of a high-speed train (or other vehicles) traveling at 300 km/h, a high-speed train traveling at 500 km/h, and/or a vehicle in a highway traveling at a speed of 120 km/h. The beam dwelling time may be dependent/based/determined by one or more factors. The one or more factors may include the speed of the wireless communication device, the distance between the wireless communication node and the wireless communication device, the width of the beam(s), and/or other factors. In some embodiments, the beam dwelling time may be as small as 7 ms (or other numbers). Current beam management procedures/processes (e.g., beam reporting, beam group activation, and/or beam indication) may fail to update a beam within the smallest value of beam dwelling time (e.g., 7 ms and/or other time instances). In some embodiments, artificial intelligence (AI) techniques/approaches can be used to ensure one or more narrow beams provide better/increased/enhanced coverage and/or performance in high-speed scenarios. For instance, AI techniques can be employed/used/applied in beam prediction with trajectory prediction for mobility.

In some embodiments, a beam state may correspond/refer to a QCL state, a TCI state, a spatial relation state (or spatial relation information state), a reference signal (RS), a spatial filter, and/or pre-coding. In some embodiments of the present disclosure, a "beam state" may be referenced as a "beam". Specifically:

a) A transmit (Tx) beam may correspond/refer to a QCL state, a TCI state, a spatial relation state, a DL/UL reference signal, a Tx spatial filter, and/or Tx precoding.

b) A receive (Rx) beam may correspond/refer to a QCL state, a TCI sate, a spatial relation state, a spatial filter, a Rx spatial filter, and/or Rx precoding.

c) A beam identifier (ID) may correspond/refer to a QCL state index, a TCI state index, a spatial relation state index, a reference signal index, a spatial filter index, a precoding index, and/or other indices.

In some embodiments, the spatial filter may correspond to the perspective of the wireless communication device and/or the wireless communication node. In some embodiments, the spatial filter may refer to a spatial-domain filter and/or other filters. In some embodiments, a spatial relation information may comprise one or more reference RSs. The spatial relation information may be used to specify/indicate/ convey/represent the spatial relation between a targeted RS/channel and the one or more reference RSs. In some embodiments, a spatial relation may refer to a beam, a spatial parameter, and/or a spatial filter.

In some embodiments, a QCL state may comprise one or more reference RSs and/or one or more corresponding QCL type parameters. The QCL type parameters may include at least one of a Doppler spread, a Doppler shift, a delay spread, an average delay, an average gain, and/or a spatial parameter (e.g., a spatial Rx parameter). In some embodiments, a TCI state may correspond/refer to a QCL state. In some embodiments, a QCL Type A may include a Doppler shift, a Doppler spread, an average delay, and/or a delay spread. In some embodiments, a QCL Type B may include a Doppler shift and/or Doppler spread. In some embodiments, a QCL Type C may include a Doppler shift and/or an average delay. In some embodiments, a QCL Type D may include a spatial Rx parameter. In some embodiments, a RS may comprise a channel state information reference signal (CSI-RS), a synchronization signal block (SSB) (or SS/PBCH), a demodulation reference signal (DMRS), a sounding reference signal (SRS), a physical random access channel (PRACH), and/or other signals/channels. In some embodiments, the RS may comprise at least one of a DL reference signal (DL RS) and/or UL reference signal (UL RS). In some embodiments, a DL RS may comprise at least one of a CSI-RS, SSB, and/or DMRS (e.g., DL DMRS). In some embodiments, an UL RS may comprise at least one of a SRS, DMRS (e.g., UL DMRS), and/or PRACH.

In some embodiments, an UL signal may include/comprise a PUCCH, a PUSCH, a SRS, and/or other channels/signals. In some embodiments, a DL signal may include/comprise a PDCCH, a PDSCH, a CSI-RS, and/or other channels/signals. In some embodiments, group based reporting may comprise at least one of beam group based reporting and/or antenna group based reporting. In some embodiments, an information element may include/comprise an UL signal and/or a DL signal. In some embodiments, a signal may include/comprise an UL signal and/or a DL signal. In some embodiments, channel state information may comprise at least one of: a RS indicator, a rank indicator (RI), a channel quality indicator (CQI), a precoding matrix indicator (PMI), a reference signal received power (RSRP), and/or a signal-to-interference plus noise ratio (SINR).

In some embodiments, a beam group may refer to one or more distinct Tx beams of one group that are simultaneously received and/or transmitted. In some embodiments, a beam group may refer to one or more Tx beams of one or more different groups that may not be received and/or transmitted simultaneously. Furthermore, the definition of a beam group may correspond to the perspective of the wireless communication device. In some embodiments, an antenna group may refer to one or more distinct Tx beams of one group that may not be received and/or transmitted simultaneously. In some embodiments, an antenna group may refer to one or more Tx beams of one or more distinct groups that are simultaneously received and/or transmitted.

a) Furthermore, an antenna group may refer to at least N different/distinct Tx beams of one group that may not be received and/or transmitted simultaneously. An antenna group may refer to up to N different Tx beams of one group that are simultaneously received and/or transmitted. In some embodiments, N may be a positive integer.
b) Furthermore, an antenna group may refer to one or more Tx beams of one or more different groups that are simultaneously received and/or transmitted.

In some embodiments, the definition of an antenna group may correspond to the perspective of the wireless communication device. In some embodiments, an antenna group may correspond to an antenna port group, panel, and/or wireless communication device (e.g., UE) panel. In some embodiments, antenna group switching may correspond/refer to panel switching.

In some embodiments, group information may correspond to information grouping of one or more reference signals. In some embodiments, group information may include a resource set, a panel, a sub-array, an antenna group, an antenna port group, a group of antenna ports, a beam group, a transmission entity/unit and/or a reception entity/unit. In some embodiments, group information may represent/specify/indicate a wireless communication device (e.g., UE) panel and/or one or more features of the wireless communication device panel. In some embodiments, group information may refer to a group state and/or group ID.

In some embodiments, a time unit may include a sub-symbol, a symbol, a slot, a sub frame, a frame, a transmission occasion, and/or other time instances. In some embodiments, a transmission offset may include or correspond to a time-domain offset for a DL and/or UL signal transmission. In some embodiments, a transmission period may include or correspond to a time-domain period for a DL and/or UL signal transmission. In some embodiments, an active antenna group may correspond to an active DL antenna group, an active UL antenna group, an active DL and UL antenna group, and/or other groups. In some embodiments, a UL power control parameter may include a target power (P0), a path loss RS (e.g., a coupling loss RS), a scaling factor for path loss (e.g., alpha), and/or a closed loop process.

A. Embodiment 1: General Description of a Predictable Model for Beam Management

In a high-speed railway (HSR) scenario, the trajectories of one or more trains may show periodicity and/or regularity. For position information, historical beam training results can become valuable references in future beam training processes. However, the accuracy of the position and/or environmental information may include one or more limitations. As a result, approaches/techniques for radiating/shaping/directing beams may be unable to completely depend on (or use) the measurements of position information. Therefore, appropriate beam measurement and/or reporting may be required to assist a predictable model (e.g., to achieve fine synchronization of beam transitions).

Figure 5:
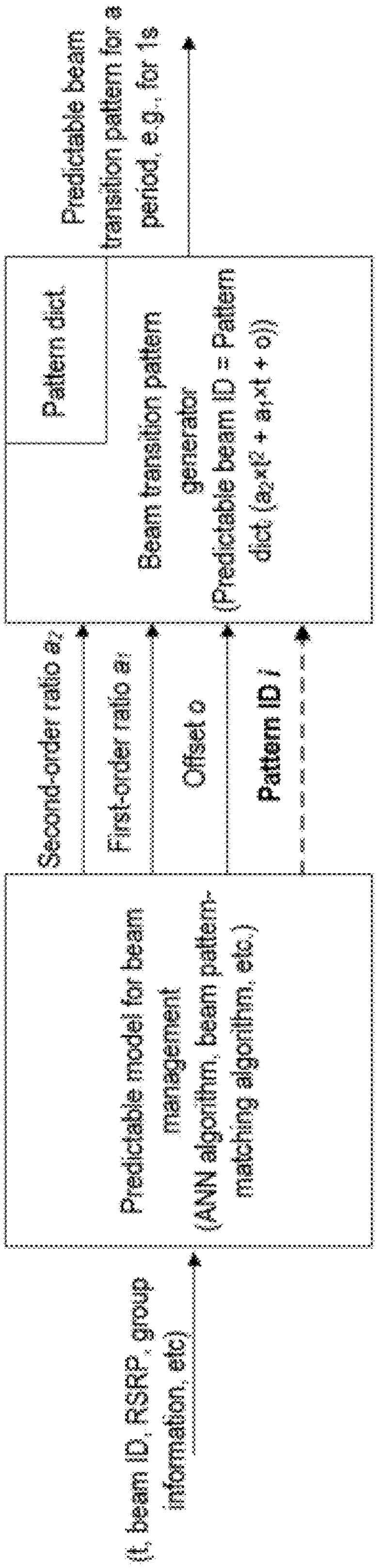
FIG. 5 illustrates example approaches for predictable beam management, in accordance with some embodiments of the present disclosure.

Referring now to FIG. 5, depicted is an example approach 500 for predictable beam management (e.g., a model-driven approach). Predictable beam management may comprise at least two parts: a predictable model for beam management and/or a beam transition pattern generator. The predictable model can be based on an artificial neutral network (ANN), a beam-level pattern matching algorithm, and/or other techniques/approaches. The predictable model can be used to estimate/configure one or more key parameters to determine one or more beam transitions (e.g., one or more beam transition patterns for a given period, such as 1 second). For instance, the one or more key parameters may include a first ($a_1$) and/or second ($a_2$) ratio of the current speed of the wireless communication device to the speed of the wireless communication device for generating a statistical pattern. The one or more key parameters may include a corresponding offset (o) and/or a type of pattern to be used (e.g., a Pattern ID (i), such as two or more parallel rails and/or a related UE movement direction).

The Pattern ID (i), second-order ratio ($a_2$), first-order ratio ($a_1$), and/or offset (o), as shown in FIG. 5, may include or correspond to unknown variables. From a Physics point of view, the variables of $a_1$ and/or $a_2$ may indicate/specify the first and/or second order ratio of the current speed of the wireless communication device to the speed of the wireless communication device for generating a statistical pattern. The variable o may indicate/specify the offset. For instance, if the speed of the wireless communication device for generating a statistical pattern in a dictionary is 300 km/h, the valuable value of a may include or correspond to [0.8~1.2] ~ 240 km/h to 360 km/h.

Figure 6:
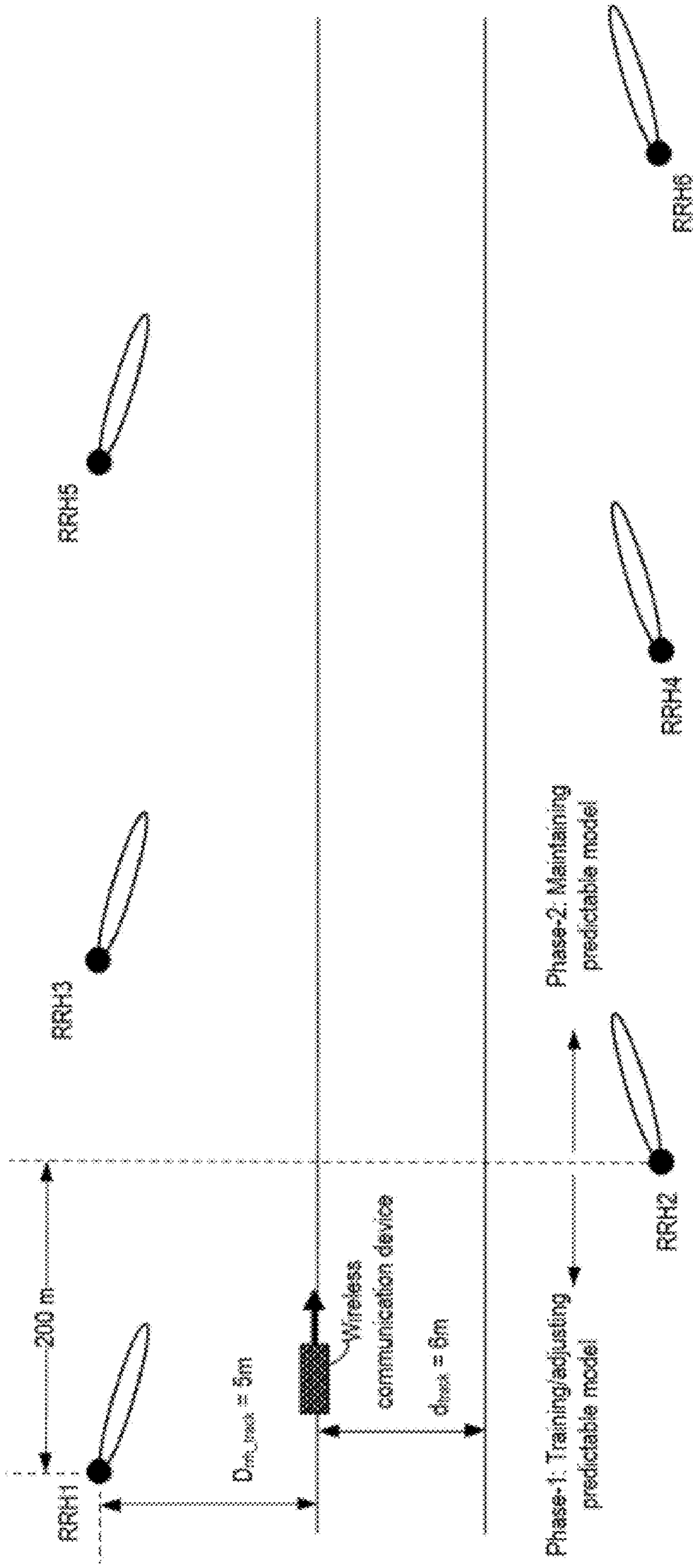
FIG. 6 illustrates example approaches (with at least two phases) for predictable beam management, in accordance with some embodiments of the present disclosure.
Figure 7:
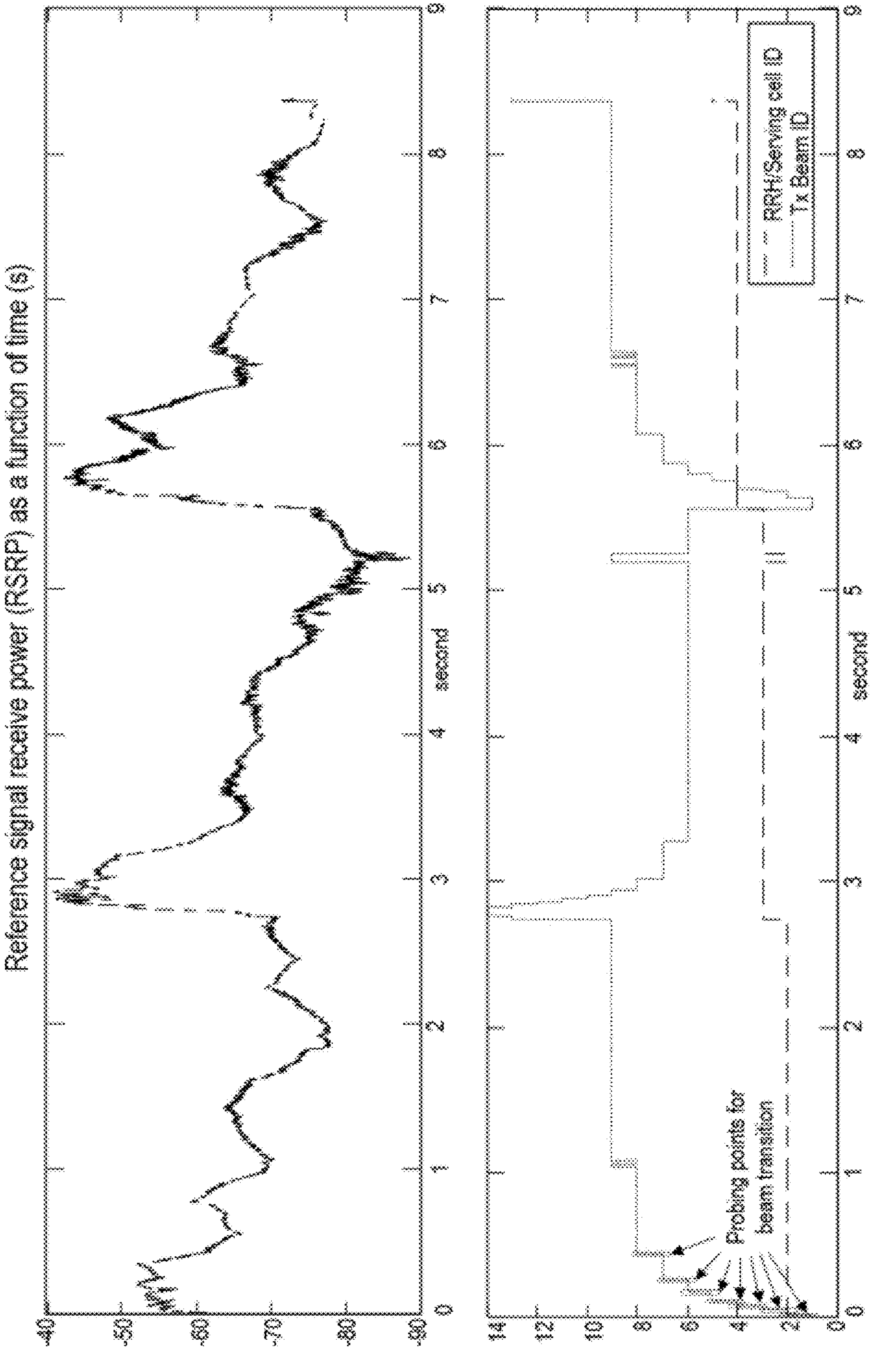
FIG. 7 illustrates example probing points for beam transition when a wireless communication device travels along a rail, in accordance with some embodiments of the present disclosure.

In some embodiments, the wireless communication device may travel/move/progress/advance along one or more RRHs/TRPs. If the wireless communication device travels along one or more RRHs/TRPs, the predictable beam management approach may include at least two phases/parts. Referring now to FIG. 6, depicted is an example scenario 600 of a wireless communication device (e.g., UE) travelling/moving along one or more RRHs/TRPs (e.g., RRH1, RRH2, RRH3, RRH4, RRH5, RRH6, and/or other RRHs). The example scenario 600 depicts the at least two phases of the predictable beam management approach:

- Phase 1: Training/Adjusting the predictable model: The predictable model can be trained/adjusted/modified/fine-tuned upon the initial access of the wireless communication device to a serving cell/group of RRHs/TRPs. Initial beam information may be provided/indicated/specified by the initial access and/or position information of the wireless communication device. Furthermore, a high-density measurement (e.g., every 1 ms) can be taken/acquired/performed for beam-level transition synchronization. The high-density measurement can be used to train/adjust the predictable model.
- Phase 2: Maintaining the predictable model: The beam transition/switching of the wireless communication device may be determined/configured according to (or based on) the recommended beam transition pattern generator and/or the key parameters from the predictable model. In certain scenarios, the beam pattern may undergo/experience unexpected changes, such as in weather conditions, when meeting another train from an opposite direction, and/or during fast/abrupt/sudden changes of the speed of the train (e.g., rush to speed up/slow down). If the beam pattern undergoes unexpected changes, the channel quality can be probed/examined/analyzed (as needed) among neighbouring/adjacent beams. However, to reduce/save/limit RS overhead and/or improve the benefits, channel probing may occur when the wireless communication device is close to the location of a beam transition point. Referring now to FIG. 7, depicted are various examples of probing points for beam transition when a wireless communication device travels along a rail (e.g., as shown in FIG. 6). In some embodiments, the probing points may fail to exhibit/show/follow any clear periodicity/pattern (e.g., in terms of the time domain).

The systems and methods presented herein may consider/contemplate one or more of the following aspects for beam measurement and/or reporting in predictable mobility scenarios:

- RS configuration for CSI report configuration and trigger state: A flexible/adaptable RS configuration can be supported to meet/satisfy a requirement of a time-variant beam measurement based on a predicted beam transition. The flexible RS configuration can be supported via a MAC-CE/DCI command/signaling and/or an association between a plurality of RS sets and/or settings. The details of such a flexible RS configuration for CSI report configuration and trigger state can be found in Embodiment #2.
- Initializing one or more CSI measurement/report instances by using a single command: In some embodiments, one command/signaling can be used to trigger/cause a single aperiodic CSI measurement/report and/or to initiate periodic/semi-persistent CSI measurements/reporting. Instead of using one command to trigger aperiodic/periodic/semi-persistent CSI measurements/reporting, one or more CSI measurement/report instances (e.g., for normal CSI acquisition, such as pre-coding matrix indicator (PMI), channel quality indicator (CQI) and rank indicator (RI)) can be initiated by a single command based on (or according to) the results of a predictable beam transition. In some embodiments, the wireless communication node (e.g., gNB) can indicate/specify/provide the updated beam state in advance to compensate (in advance) for the latency introduced by beam indication. Additional details can be found in Embodiment #3.

In some embodiments, a starting point of an indicated beam state (or other transmission parameters) may be determined/configured according to (or based on) a timing parameter, such as a time stamp, a time interval, and/or other time instances.

- Furthermore, the time stamp (or other timing parameters) may be associated/related with a beam state (e.g., a transmission parameter). In some embodiments, the time stamp may be activated/enabled by a signaling, such as a MAC-CE and/or DCI command.
- The beam state (or other transmission parameters) can be applied to DL signals and/or UL signals. For instance, the beam state can be applied to an information element, such as a PDCCH, PDSCH, PUCCH, SRS, and/or others, to update the DL and UL RS/channels together/jointly based on a single command.
- In some embodiments, the indicated beam state may be determined/configured according to (or based on) the predictable model rather than only measurement results.
- In some embodiments, a signaling (e.g., radio resource control (RRC), DCI and/or MAC-CE signaling) may indicate/provide/specify a list of beam states. Each of the beam states of the list may be applied in an order or a cyclic sequence. A first beam state of the list of beam states may be applied after a last beam state is applied.
  - For instance, the beam states may comprise X beam states to be indicated. In some embodiments, there is a time domain interval between beam state (i mod X) and beam state (i+1) mod X of the X beam states, where X is an integer and i is an integer (e.g., i=0, 1, 2 . . . ). Once a time domain interval for beam state (i mod X) is passed, the next beam state (e.g., a beam state comprising beam state ((i+1) mod X) is applied.
  - Furthermore, at least one of the following parameters can be indicated by RRC and/or MAC-CE signaling (or other types of signaling):
    - The first beam state to be applied from the list of beam states.
    - A scaling factor of a timing parameter (e.g., a time interval and/or period).
    - One or more updated timing parameters corresponding to a specific beam state (e.g., for the first beam state to be applied from the list of beam states).

Figure 8:
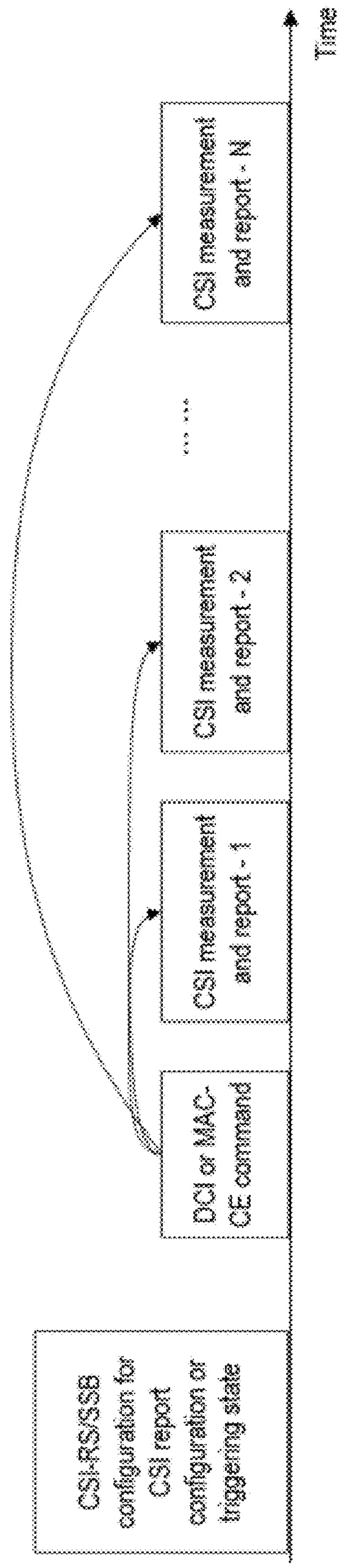
FIG. 8 illustrates example signaling interactions for beam measurement or reporting in predictable mobility, in accordance with some embodiments of the present disclosure.
Figure 9:
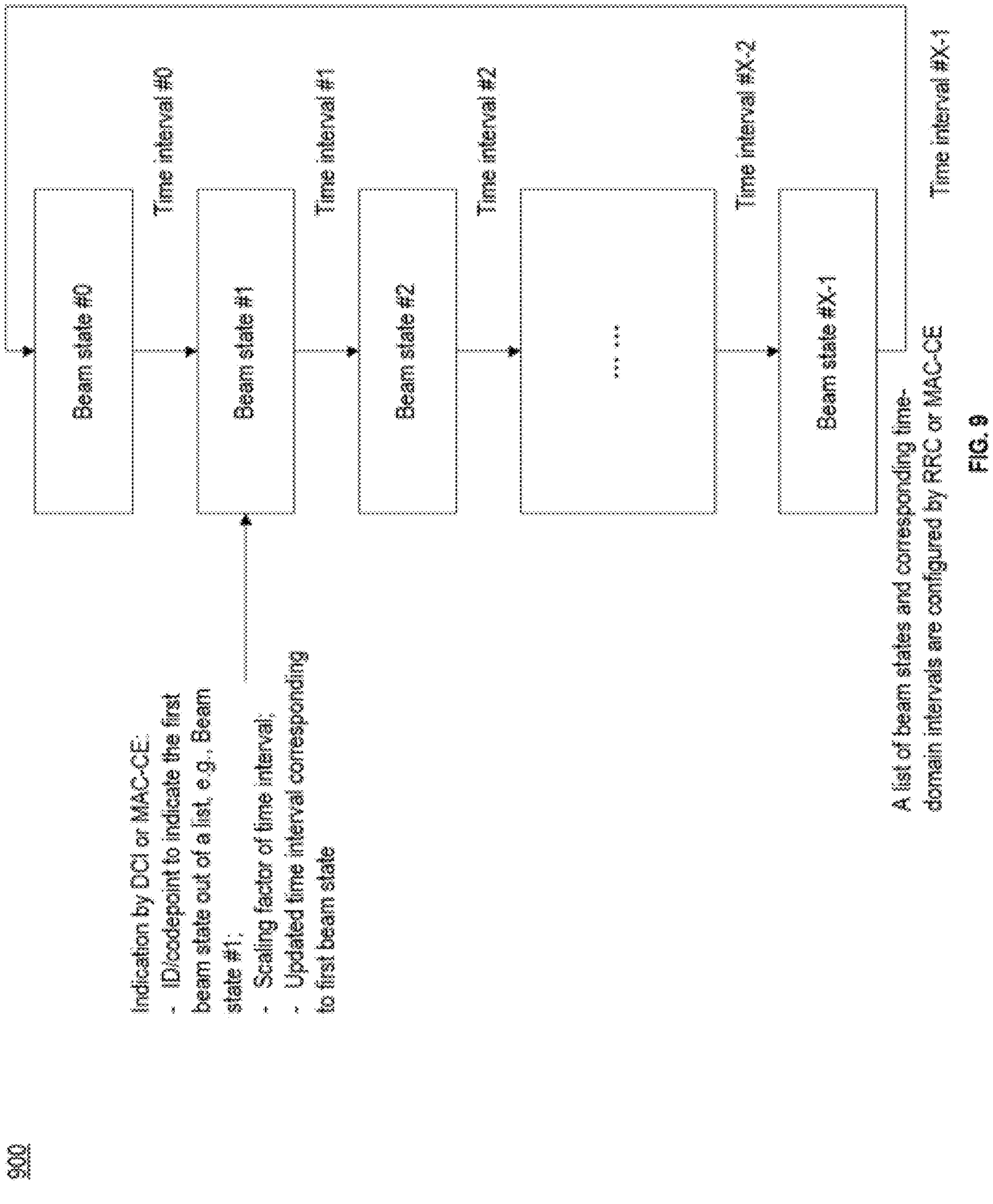
FIG. 9 illustrates example approaches for indicating a list of beam states (or other transmission parameters) and/or timing parameters, in accordance with some embodiments of the present disclosure.

Referring now to FIG. 8, depicted are example signaling interactions for beam measurement and/or reporting in predictable mobility. FIG. 9 depicts an example approach 900 for indicating a list of beam states (or other transmission parameters) and/or timing parameters (e.g, time intervals). In some embodiments, a signaling (e.g., RRC and/or MAC-CE signaling) may configure a list of beam states (or other transmission parameters) and/or corresponding time intervals between at least two neighbouring/adjacent beam states. A DCI command (or other signaling) may indicate/specify/provide the starting point to apply the list of beam states. The DCI command (or other signaling) may include/provide/indicate an ID/codepoint to specify the first beam state of the list of beam states (e.g., beam state #1 as a starting state), a scaling factor of a time interval (see details in Embodiment #2), an updated time interval corresponding to the first beam state, and/or other information.

B. Embodiment 2: RS Configuration Network for Enabling Predictable Beam Management The RS configuration framework may be reconsidered/reassessed/modified to achieve/enable fine synchronization of beam transitions (or beam switching) in a given period (e.g., 1 second or other periods) along a predictable trajectory. In high mobility cases/scenarios, such as those involving a high way or HST, neighbouring/adjacent wireless communication devices may be located in a same railway carriage, a same long-distance bus and/or a same group of cars. Therefore, the neighbouring/adjacent wireless communication devices may share/use the same RS for fine synchronization of beam transitions in order to reduce/decrease RS overhead.

Figure 10:
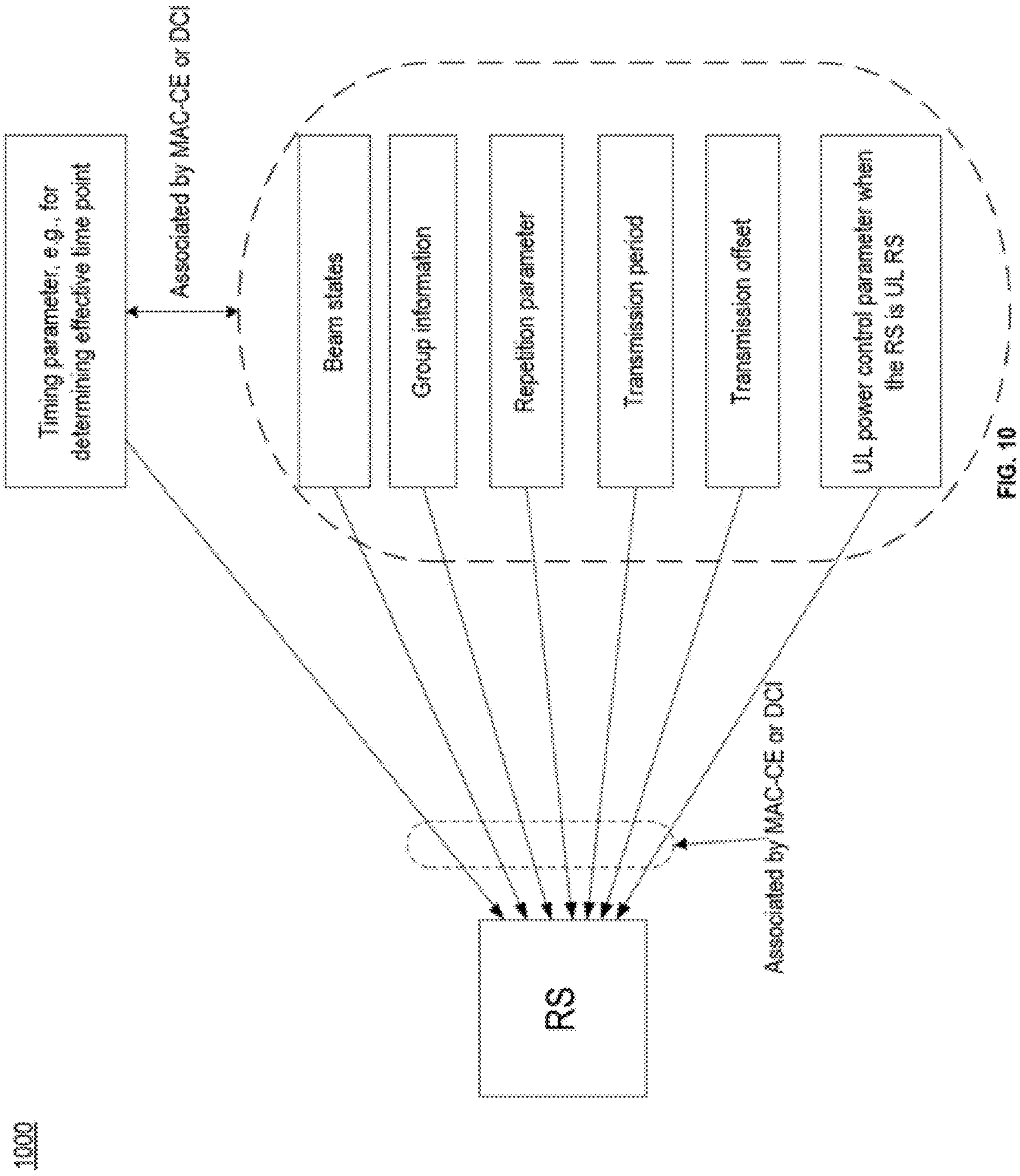
FIG. 10 illustrates example signaling interactions for beam measurement and/or reporting in predictable mobility, in accordance with some embodiments of the present disclosure.

Referring now to FIG. 10, depicted is an example approach 1000 of signaling interactions for beam measurement and/or reporting in predictable mobility. For a RS, at least one of the following transmission parameters can be associated/related/linked with a timing parameter: a beam state, group information, a repetition parameter, a transmission period, a transmission offset, and/or an UL power control parameter.

- In some embodiments, a RS may comprise or correspond to at least one of: a RS resource, a RS resource set, a RS resource setting, a reporting configuration and/or a triggering state.
- In some embodiments, the timing parameter can be used to determine the time point of at least one of: a beam state, group information, a repetition parameter, a transmission period, a transmission offset, and/or an UL power control parameter. The time point may include a time unit, an effective time, a starting time and/or an ending time.
  - In some embodiments, a signaling (e.g., RRC, MAC-CE and/or DCI signaling) may provide/specify/indicate/perform an association/relationship between a timing parameter and a transmission parameter. The transmission parameter may comprise at least one of: a beam state, group information, a repetition parameter, a transmission period, a transmission offset, and/or an UL power control parameter.
- In some embodiments, the timing parameter may comprise at least one of: a time stamp, a time unit index, a time-domain period, a time-domain interval, and/or a time-domain offset. Furthermore, the time-domain offset may comprise at least one of: a time-domain offset for a starting point and/or a time-domain offset for an ending point.
  - In some embodiments, the timing parameter may comprise a list of timing parameters. In some embodiments, the transmission parameter may comprise a list of beam states. In some embodiments, a list of beam states may be associated/related with the timing parameter. If the timing parameter comprises a list of timing parameters and the list of beam states is associated with the timing parameter, a mapping between two neighbouring/adjacent/associated beam states in the list of beam states, and a timing parameter from the list of timing parameters is determined.
    - For instance, in some embodiments, there are X beam states and/or (X−1) time intervals. Therefore, the time interval between effective time points of an i-th beam state and an (i+1)-th beam state may be determined according to (or based on) a time interval i.
    - In some embodiments, a signaling (e.g., DCI and/or MAC-CE signaling) may indicate/specify/provide the time interval and/or scaling factor of the time interval (e.g., to facilitate different speeds of a wireless communication device, such as 240 km/h~360 km/h).
    - For instance, the applied time interval may be determined according to (or based on) the scaling factor*the reference time interval (e.g., 20 slots or other numbers). The scaling factor can be 0.1, 0.2, . . . , 2.0.
      - In some embodiments, the applied time interval may include or correspond to ceil (scaling factor*the reference time interval), floor (scaling factor*the reference time interval), and/or round (scaling factor*the reference time interval).
- In some embodiments, a timing parameter may comprise a time-domain period and/or a time-domain offset. In some embodiments, a transmission parameter, such as a list of beam states, may be associated/related with the timing parameter. If the timing parameter comprises a time-domain period and/or a time-domain offset, and if a list of beam states is associated with the timing parameter, a respective beam state of the list of beam states may be applied to an information element (e.g., DL and/or UL signals) in order, according to the time-domain period and/or the time-domain offset.
  - For instance, the time-domain period and/or time-domain offset may include or correspond to P and/or Y respectively. In some embodiments, the starting point/time of activating the set of beam states may be X time units. If the time-domain period and/or time-domain offset are P and/or Y, and if the starting point/time of activating the set of beam states is X time units, the first beam state in the set may be applied starting from an X+Y time unit, the second beam state in the set may be applied starting from X+Y+P time unit, and so forth.
- In some embodiments, a time-domain period and/or time-domain offset can be coded jointly in a single parameter (e.g., periodicityAndOffset and/or other parameters).
- In some embodiments, an information element may comprise a plurality of information elements (e.g., CSI-RS, PDSCH/PDCCH, and/or other UL/DL channels/signals or periodic/aperiodic RSs). Each of the information elements may be associated/related with a separate/distinct/different timing parameter.

In some embodiments, a data transmission may use/require additional UE Rx beam refinement, frequency synchronization, and/or timing synchronization. One or more separate/distinct timing parameters (e.g., a time-domain offset) may be used for CSI-RS (e.g., CSI-RS for beam management and CSI-RS for tracking (TRS)) and/or PDSCH/PDCCH transmissions. For example, a beam state #i may be applied to a PDSCH/PDCCH transmission starting from slot-n. Furthermore, the beam state #i can be applied to a CSI-RS transmission starting from slot-{n−X}. The parameter X may indicate/specify/provide a configured additional time-domain offset (or other timing parameters) for the CSI-RS transmission.

Figure 11:
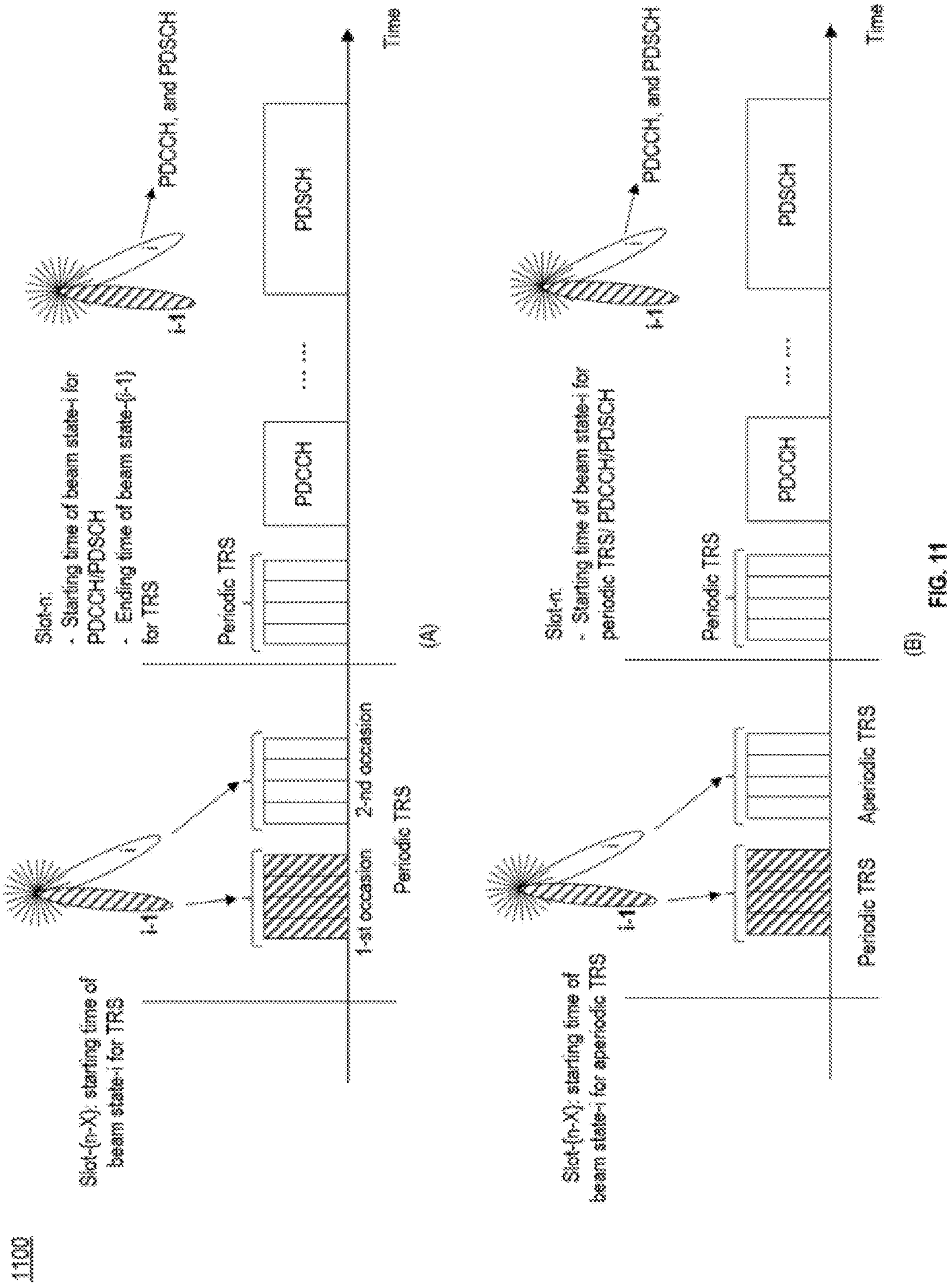
FIG. 11 illustrates example approaches for using one or more separate timing parameters for two or more types of DL/UL signaling, in accordance with some embodiments of the present disclosure.

Referring now to FIG. 11, depicted is an example approach 1100 for using one or more separate/distinct timing parameters for two or more types of DL/UL signaling (e.g., CSI-RS, PDSCH/PDCCH, periodic/aperiodic RS, and/or other types of signaling). FIG. 11A depicts an additional time-domain offset (e.g., an earlier effective time/point) for TRS. From slot-{n-X} to slot-{n}, there are at least two different/separate/distinct transmission occasions (e.g., $1^{st}$ occasion and/or $2^{nd}$ occasion) for a same TRS (e.g., a periodic TRS). The at least two different transmission occasions may correspond to a respective beam state (e.g., a previous beam state (i−1) and/or an updated beam state (i)) due to one or more different transmission offsets associated with the respective beam state. The wireless communication device may monitor the at least two occasions together/jointly during this period (e.g., from slot-{n-X} to slot-n). After slot-n, one or more TRS transmission occasions corresponding to beam-i (e.g., the updated beam state) may be received/obtained.

FIG. 11B depicts one or more separate/distinct timing parameters (e.g., one or more additional time-domain offsets for an aperiodic RS). As a result, an aperiodic TRS may be triggered in advance by using an updated beam state (e.g., beam state i) from slot-{n-X} to slot-n. Triggering an aperiodic TRS in advance may be beneficial for the UE beam refinement, time synchronization and/or frequency synchronization of the subsequent data transmission.

In some embodiments, the wireless communication node may configure one or more of the following candidates for RS configuration:

Mode-1: In some embodiments, the wireless communication device may receive/obtain the signaling (e.g., RRC and/or MAC-CE signaling) to configure a plurality of parameters sets. Each of the plurality of parameter sets may be associated with or comprise at least one of a respective timing parameter and/or a respective transmission parameter (e.g., a beam state, group information, a repetition parameter, a transmission period, a transmission offset, and/or an UL power control parameter). In some embodiments, the wireless communication device may receive/obtain the signaling or another signaling (e.g., MAC-CE signaling and/or DCI signaling) to associate an information element (e.g., RS and/or other information elements) with one or more of the plurality of parameter sets.

Mode-2: In some embodiments, a beam state (or other transmission parameters) can be associated with a parameter set. The parameter set may comprise at least one of: a timing parameter, group information, a repetition parameter, a transmission period, a transmission offset, and/or an UL power control parameter. In some embodiments, the wireless communication device may associate the beam state with the parameter set by/via RRC signaling, MAC-CE signaling, and/or other types of signaling. In some embodiments, the signaling (e.g., MAC-CE and/or DCI signaling) may indicate/specify/provide at least one beam state for the information element (e.g., a RS and/or other information elements). The wireless communication device may apply the parameter set to the information element accordingly.

Method-3: At least one of: a beam state, a timing parameter, group information, a repetition parameter, a transmission period, a transmission offset, and/or an UL power control parameter can be activated/enabled for an information element (e.g., a RS) by/via MAC-CE signaling (or other types of signaling).

C. Embodiment 3: Detailed Association Between Transmission Parameters Related to a RS and a Timing Parameter One or more embodiments of the present disclosure may discuss one or more transmission parameters related/associated to a RS (or other information elements) with respect to the determination/configuration of an effective time/point.

One or more beam states (or other transmission parameters) can be configured/determined with (or by using) a RS (or other information elements). The one or more beam states can be applied in a predetermined order/sequence and/or according to (or based on) at least one associated timing parameter (e.g., timing parameter to determine and effective time, starting time, and/or ending time).

The wireless communication device may receive/obtain/acquire the signaling (e.g., MAC-CE signaling) from the wireless communication node. The signaling can be used to activate/configure/enable the beam state (or other transmission parameters) and/or the corresponding timing parameter (e.g., applicable time for the beam state, such as a time stamp) for the information element (e.g., RS).

The wireless communication device may receive/obtain the signaling (e.g., MAC-CE signaling) to associate/configure at least one timing parameter with at least one transmission parameter corresponding to the information element (e.g., RS). For example, the signaling can be used to configure a set of one or more beam states (or other transmission parameters) and/or one or more corresponding timing parameters (e.g., an applicable time for the beam state, such as a time stamp) for a RS (or other information elements). A DCI (or other signaling) may be used to indicate/specify/provide at least one beam state of the set of beam states for the RS.

In some embodiments, the wireless communication device and/or wireless communication node may determine/configure one or more information elements. For example, the wireless communication device may configure at least one repetition parameter (configured with the RS) according to (or based on) an associated timing parameter. In another example, the wireless communication device may configure the at least one repetition parameter according to an indication by a MAC-CE and/or DCI signaling. In another example, the at least one repetition parameter (configured with the RS) may be indicated/specified/provided in a MAC-CE and/or DCI signaling.

For instance, the repetition parameter may be activated/enabled for a RS (e.g., CSI-RS resource set and/or SRS resource set) in a MAC-CE signaling.

In some embodiments, an UL power control parameter of the RS (or other information elements) may be determined/configured according to the associated/related timing parameter.

In some embodiments, at least one of a transmission period and/or transmission offset may be determined/configured according to (or based on) a signaling (e.g., MAC-CE and/or DCI signaling).

The signaling (e.g., the MAC-CE and/or DCI signaling) may be used to activate/enable/indicate/specify at least one beam state (or other transmission parameters) for the RS (or other information elements).

In some embodiments, the signaling (e.g., MAC-CE signaling) may be configured to activate/enable at least one transmission parameter for the information element (e.g., a semi-persistent RS). Furthermore, the signaling may be configured to provide/specify/indicate one or more timing parameters for the information element. The one or more timing parameters may include a time domain offset and/or an additional offset.

In some embodiments, at least one beam state (or other transmission parameters) for an information element, such as a RS (e.g., periodic and semi-persistent TRS), may be updated by/via MAC-CE and/or DCI signaling/command. A time unit of the information element (e.g., RS) may be determined/configured according to (or based on) the timing parameter (e.g., a transmission offset) associated with the beam state (or other transmission parameters).

In some embodiments, a beam state (or other transmission parameters) may be associated/related with a transmission period and/or transmission offset which is applied to the information element (e.g., RS).

For instance, a SRS transmission occasion may be determined according to (or based on) at least one RRC parameter (e.g., periodicityAndOffset). In order to train a group of wireless communication devices together, the at least one RRC parameter may be associated/related with a beam state (or other transmission parameters). In other words, when the beam of the SRS is changed/modified, the slot of the SRS may be changed accordingly.

6.4.1.4.4 Sounding Reference Signal Slot Configuration

For an SRS resource configured as periodic or semi-persistent by the higher-layer parameter resourceType, a periodicity $T_{SRS}$ (in slots) and slot offset $T_{offset}$ are configured according to the higher-layer parameter periodicityAndOffset-p or periodicityAndOffset-sp. Candidate slots in which the configured SRS resource may be used for SRS transmission are the slots satisfying $$\left(N_{slot}^{frame,\mu} n_f + n_{s,f}^{\mu} - T_{offset}\right) \bmod T_{SRS} = 0$$

SRS is transmitted as described in clause 11.1 of [5, TS 38.213].

D. Embodiment 4: Initializing Multiple CSI Measurements and CSI Report Instances by a Single Command Frequent reconfiguration/triggering/initialization of beam reporting in UE high mobility scenarios may increase signaling overhead. Certain methods/approaches (e.g., AI based methods) for predictable beam management may include a method/approach for initializing a package of a plurality of instances of beam measurements. At least one beam measurement may correspond to a respective TCI/spatial relation configuration. The configuration (e.g., RS configuration) of an aperiodic and/or periodic RS may be refined for different/separate/distinct instances. In one or more embodiments of the present disclosure, the association/relationship between a RS (e.g., a RS resource, a RS resource set, a RS resource setting, a reporting configuration and/or a triggering state) and a timing parameter may be expanded upon.

In some embodiments, a RS resource, a RS resource set, a RS resource setting, a reporting configuration and/or a triggering state may be associated/related with at least one timing parameter.

A number of RS resources in a RS resource set and/or a number of RS resources to be measured/reported in the RS resource set may be associated/related with the timing parameter. In some embodiments, the number of RS resources in the RS resource set and/or the number of RS resources to be measured/reported in the RS resource set may be determined/configured by a MAC-CE and/or DCI signaling/command.

In some embodiments, one or more time units of a RS transmission, or of a transmission (e.g., PUCCH/PUSCH) carrying CSI may be determined/configured according to the timing parameter. In some embodiments, one or more time units of a CSI report instance transmission (e.g., reportSlotConfig) may be determined according to the timing parameter.

In some embodiments, the association/relationship between a RS resource, a RS resource set, a RS resource setting, a reporting configuration and/or a triggering state, and the time parameter may be determined/configured by (or according to) a MAC-CE and/or DCI signaling/command.

In some embodiments, the timing parameter may comprise at least one of: a time stamp, a time unit index, a time-domain period, and/or a time-domain offset (see Embodiment #2).

In some embodiments, at least one triggering state may be associated with one or more reporting configurations and/or the timing parameter. Each of the one or more reporting configurations may comprise a CSI-RS resource set (or other RS resource settings). The timing parameter may be applied to at least one of: a transmission of the channel state information and a transmission of the RS.

The triggering state may be indicated/specified/provided by the DCI and/or MAC-CE signaling. In some embodiments, the CSI-RS resource set corresponding to the one or more reporting configurations may be transmitted/sent in an order/sequence according to the timing parameter (e.g., time-domain period and/or the related time stamp).

The timing parameter may comprise a list of time parameters, such as time-domain offsets. Each of the time parameters of the list of time parameters may correspond to one of the one or more reporting configurations, the corresponding RS resources, and/or the corresponding RS (e.g., CSI-RS) resources sets.

In some embodiments, a triggering state for a DCI may be associated with a timing parameter and/or one or more CSI report configurations (or other reporting configurations). Each of the reporting configurations of the one or more reporting configurations may comprise the RS resource and/or the RS resource setting. The timing parameter can be applied to a CSI report and/or RS transmission.

For instance, the timing parameter may comprise a time-domain period parameter Y. For an $i^{th}$ CSI report configuration (or other reporting configurations), an additional time domain offset of the CSI report and/or the RS transmission occasion may be determined according to the time-domain period parameter Y (e.g., Y*(i−1)).

E. Embodiment 5: CSI Measurement and Report based on Multiple RS Repetitions with Different Beam States The CSI triggering state (or other triggering states) may be configured with a CSI reporting configuration. The CSI reporting configuration (or other reporting configurations) may comprise a period of report period and/or N parameter lists for RS resource setting. Each of the N parameter lists may comprise one or more independent beam states for each transmission occasion of a respective RS resource in a RS resource set, a respective time offset for each transmission occasion, and/or a respective time offset for each of the corresponding reports. The period and/or time-domain offset may be used for determining at least one CSI-RS transmission occasion and/or a corresponding report instance transmission occasion.

A time unit of an $i^{th}$ transmission of a RS resource set (or other transmission occasions) may be determined according to the timing parameter. The timing parameter may comprise a time-domain period and/or a time-domain offset. For example the time unit of each of a plurality of transmission occasions may be determined according to the time-domain period*i+the time-domain offset associated with the CSI-RS resource set i+time unit of the DCI.

The time unit of the $i^{th}$ CSI report (corresponding to $i^{th}$ transmission of the RS resource set) may be determined according to (or based on) the time-domain period*i+the time-domain offset corresponding to i-th CSI report+time unit of the DCI.

The wireless communication node may preconfigure/predetermine a list of beam states for each RS resource in a RS resource set for each transmission occasion. The wireless communication node may preconfigure the list of beam states according to (or based on) the predictable algorithm for the trajectory of the wireless communication device.

A number of CSI-RS resources in a CSI resource set may be determined based on (or according to) the feasibility of the predictable algorithm of the wireless communication node (e.g., a confident coefficient, and up to the implementation of the wireless communication node).

```
CSI Reporting Configuration
  reportPeriod
  N parameter lists of {
    reportSlotOffset
    rsSetSlotOffset
    beamStateList}
```

Figure 12:
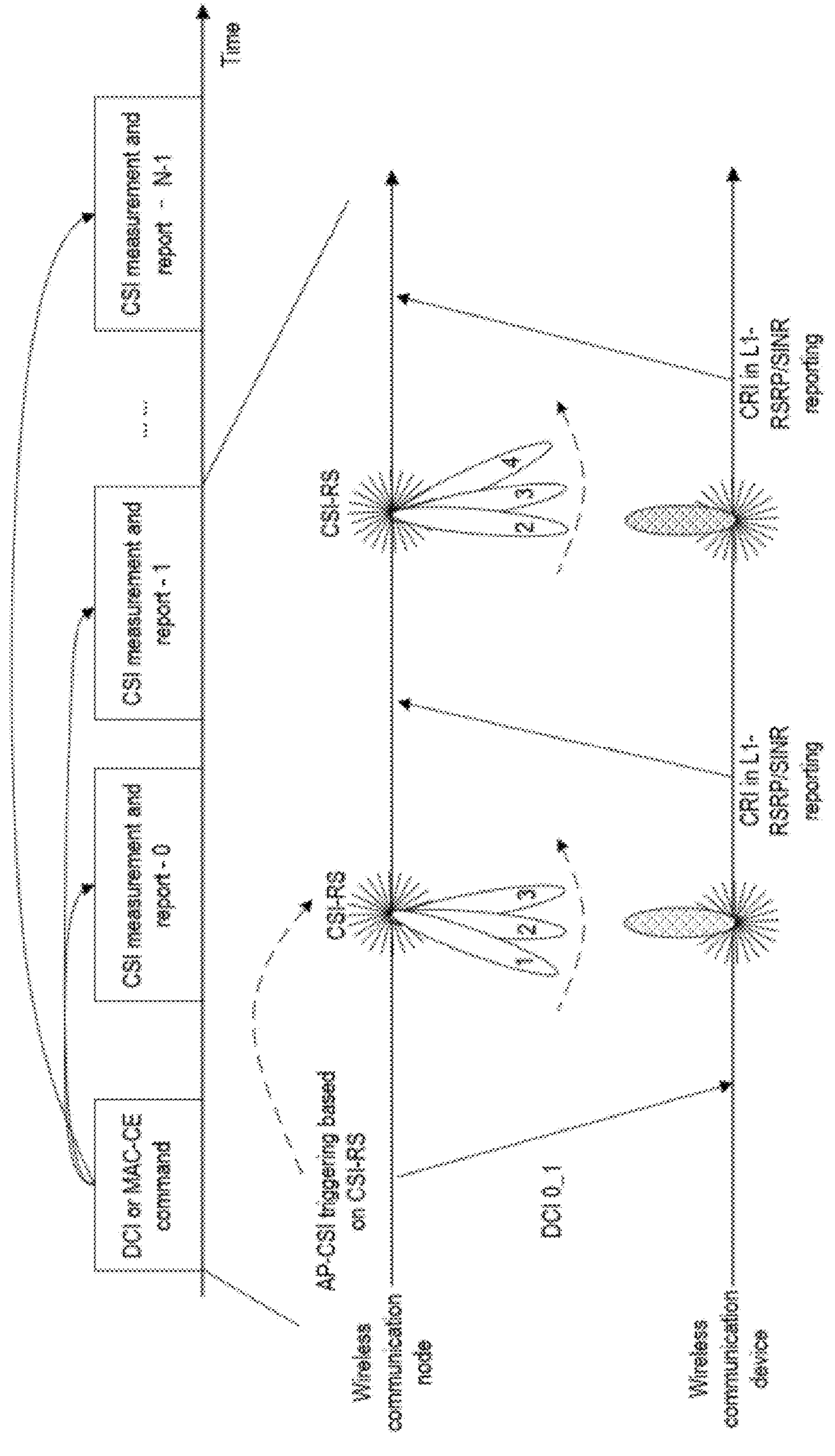
FIG. 12 illustrates example procedures of signaling interactions for beam measurement and/or reporting in predictable mobility, in accordance with some embodiments of the present disclosure.

For instance, the probing points for beam transitions may occur without a fixed period among the probing points. The CSI-RS resource set and/or report instance may be associated with one or more distinct/different/separate timing parameters (e.g., a different time-domain offset or triggering offset), even with a same period. One example can be found in FIG. 12.

F. Methods for Beam Measurement and Reporting in Predictable Mobility Scenarios

Figure 13:
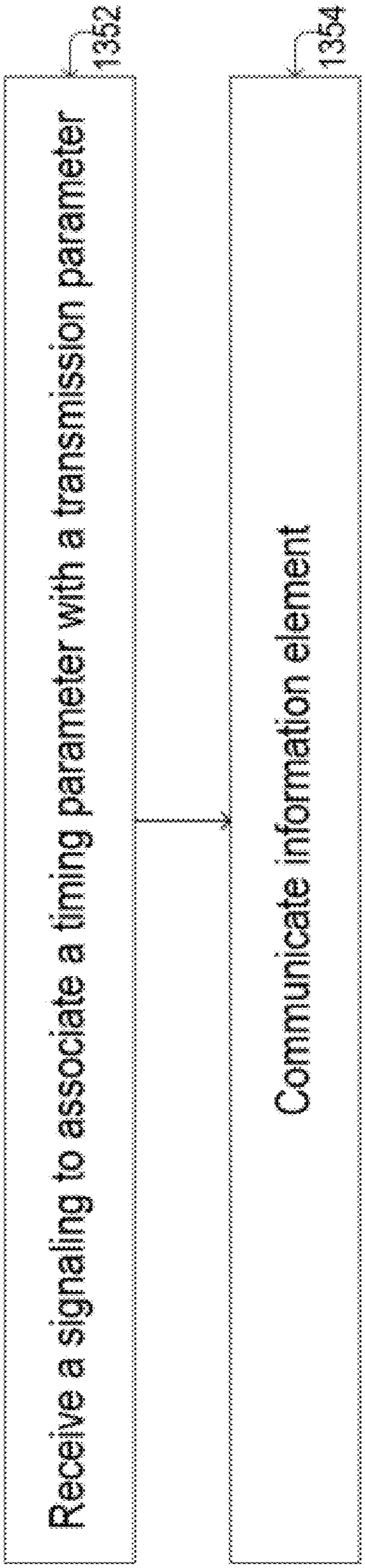
FIG. 13 illustrates a flow diagram of an example method for beam measurement and reporting in predictable mobility scenarios, in accordance with an embodiment of the present disclosure.

FIG. 13 illustrates a flow diagram of a method 1350 for beam measurement and reporting in predictable mobility scenarios. The method 1350 may be implemented using any of the components and devices detailed herein in conjunction with FIGS. 1-12. In overview, the method 1350 may include receiving a signaling to associate a timing parameter with a transmission parameter (1352). The method 1350 may include communicating the information element according to the timing parameter and the transmission parameter (1354).

Referring now to operation (1352), and in some embodiments, a wireless communication device (e.g., a UE) may receive/obtain a signaling/command (e.g., MAC-CE, RRC, DCI, and/or other types of signaling) from a wireless communication node (e.g., gNB, BS, TRP, network node). The wireless communication node may sent/transmit/broadcast the signaling/command to the wireless communication device. The wireless communication device may use the signaling to associate/relate/map a timing parameter (e.g., a timing parameter of RS sent from a BS for beam measurement and/or a timing parameter for determining an effective/application time) with a transmission parameter. The transmission parameter may correspond to an information element (e.g., a CSI-RS, a TRS, and/or other UL/DL signals). In some embodiments, the signaling may comprise a RRC signaling, a DCI signaling, a MAC-CE signaling, and/or other types of signaling. In some embodiments, the transmission parameter may comprise at least one of: a beam state, group information, a repetition parameter, a transmission period, a transmission offset, an uplink (UL) power control parameter, and/or other parameters.

Referring now to operation (1354), and in some embodiments, the wireless communication device may communicate the information element according to (or based on) the timing parameter and/or the transmission parameter. For example, the wireless communication device may receive/obtain (e.g., from the wireless communication node) the information element according to the timing parameter and/or the transmission parameter. In another example, the wireless communication device may send/transmit/broadcast (e.g., to the wireless communication node) the information element according to the timing parameter and/or the transmission parameter. The wireless communication node may cause the wireless communication device to communicate the information element. The information element may comprise a PDCCH, a PDSCH, a PUCCH, a PUSCH, a RS, and/or other signals/channels.

In some embodiments, the timing parameter may be used to determine/configure a time unit, an effective time (e.g., a time point), a starting time and/or an ending time. The effective time, starting time, and/or ending time may be used for applying the transmission parameter. In some embodiments, the timing parameter and/or a corresponding scaling factor may be used to determine/configure a time unit, an effective time, a starting time, and/or an ending time for applying the transmission parameter. In some embodiments, the timing parameter and/or the corresponding scaling factor may be indicated/specified/provided by the signaling or another signaling. The another signaling may comprise a RRC signaling, a DCI signaling, a MAC-CE signaling, and/or other types of signaling. For example, a DCI and/or MAC-CE signaling may indicate the time interval and/or scaling factor of the time interval in order to facilitate different speeds of a wireless communication device (e.g., 240 km/h~360 km/h). In some embodiments, the effective time, starting time and/or ending time may be determined/configured according to (or based on) a function of the timing parameter multiplied by the corresponding scaling factor. The function may comprise at least one of: a ceil, floor, and/or round function. For example, the effective time may be determined according to ceil (scaling factor*the timing parameter). In some embodiments, the timing parameter may comprise at least one of: a time stamp, a time unit index, a time-domain period, a time-domain interval, and/or a time-domain offset. In some embodiments, the time-domain offset may comprise at least one of: a time-domain offset for a starting time, and/or a time-domain offset for an ending time.

In some embodiments, the timing parameter may comprise a list of timing parameters. In some embodiments, the transmission parameter may comprise a list of transmission parameters (e.g., beam states). The list of transmission parameters may be associated/related/mapped with the timing parameter. In some embodiments, the mapping between two adjacent or associated transmission parameters in the list of transmission parameters and a timing parameter may be determined. In some embodiments, a timing parameter from the list of timing parameters may be determined/configured (e.g., by the wireless communication device). In some embodiments, the information element may comprise a plurality of information elements. In some embodiments, the transmission parameter may comprise a list of transmission parameters. In some embodiments, each transmission parameter in the list of transmission parameters may be applied to a respective/corresponding one of the plurality of information elements. Each transmission parameter may be applied in an order/sequence according to (or based on) the timing parameter. In some embodiments, the information element may comprise a plurality of information elements. The timing parameter may comprise a list of time-domain intervals. In some embodiments, the transmission parameter may comprise a list of beam states. Each beam state in the list of beam states may be applied to a respective one of the plurality of information elements. In some embodiments, each beam state in the list of beam states may be applied in an order/sequence according to (or based on) the list of time-domain intervals and/or a corresponding scaling factor. In some embodiments, the timing parameter may comprise a time-domain period and/or a time-domain offset. In some embodiments, the transmission parameter may comprise a list of beam states. In some embodiments, each beam state in the list of beam states may be applied to the information element. Each beam state may be applied in an order/sequence according to (or based on) the time-domain period and/or time-domain offset. In some embodiments, the time-domain period and/or the time-domain offset may be joint coded in a single parameter.

In some embodiments, the information element may comprise a plurality of information elements. A different timing parameter may be associated with each of the information elements. In some embodiments, the wireless communication device may receive/obtain the signaling (e.g., RRC and/or MAC-CE signaling) to configure a plurality of parameter sets. Each of the parameter sets may be associated/related with and/or comprise a respective timing parameter and/or a respective transmission parameter. In some embodiments, the wireless communication device may receive/obtain the signaling and/or another signaling (e.g., DCI and/or MAC-CE signaling) to associate/relate/map the information element with one or more of the plurality of parameter sets. In some embodiments, the transmission parameter may comprise at least a beam state. The wireless communication device may receive/obtain the signaling (e.g., RRC, MAC-CE, and/or DCI signaling) to associate the beam state with a parameter set. The parameter set may comprise at least one of: the timing parameter, group information, a repetition parameter, a transmission period, a transmission offset, and/or an UL power control parameter. The signaling may indicate/provide/specify the beam state for the information element. If the signaling indicates the beam state for the information element, the parameter set may be applied to the information element.

In some embodiments, the wireless communication device may receive/obtain the signaling to activate/enable the transmission parameter and/or the timing parameter for the information element. The wireless communication device may receive/obtain the signaling from the wireless communication node. In some embodiments, the signaling may be configured to activate/enable the transmission parameter for the information element. The signaling may be configured to provide the timing parameter. The timing parameter may comprise at least one of: a time-domain offset and/or an additional offset for the information element. The information element may comprise a semi-persistent RS. In some embodiments, the signaling may be configured to update/indicate/specify the transmission parameter for the information element. A time unit of the information element may be determined according to the timing parameter. The timing parameter may comprise a transmission offset associated with the transmission parameter (e.g., beam state). In some embodiments, the transmission parameter may comprise a beam state. The beam state may be associated/related with the timing parameter. The timing parameter may comprise at least one of: the transmission offset and/or a transmission period that is applied to the information element.

In some embodiments, the wireless communication device (or the wireless communication node) may determine/configure the information element. For example, the wireless communication device may determine a repetition parameter corresponding to the information element according to (or based on) an associated timing parameter and/or an indication. The indication may be provided/specified by a MAC-CE signaling, DCI signaling, and/or other types of signaling. In some embodiments, the wireless communication device may determine/configure an UL power control parameter corresponding to the information element according to (or using) the associated timing parameter. The wireless communication device may determine at least one of a transmission period and/or a transmission offset corresponding to the information element, according to (or based on) the MAC-CE and/or DCI signaling. In some embodiments, the RS may comprise and/or correspond to at least one of: a RS resource, a RS resource set, a RS resource setting, a reporting configuration and/or a triggering state. In some embodiments, a number of RS resources in the RS resource set and/or a number of RS resources to be measured/reported in the RS resource set may be associated/related with the timing parameter. In some embodiments, the number of RS resources in the RS resource set and/or the number of RS resources to be measured/reported in the RS resource set may be determined by (or according to) the signaling comprising a MAC-CE and/or DCI signaling. In some embodiments, a time unit of a transmission of the RS, or of a transmission carrying channel state information, may be determined/configured according to (or based on) the timing parameter. In some embodiments, the triggering state may be associated with multiple reporting configurations. Each of the reporting configurations may comprise the RS resource set and/or the RS resource setting. In some embodiments, the triggering state may be associated/related with the timing parameter and/or the multiple reporting configurations. Each reporting configuration may comprise a RS resource setting. The timing parameter may be applied to at least one of: a transmission of the channel state information and/or a transmission of the RS.

In some embodiments, the triggering state may be indicated/provided/specified by the MAC-CE and/or DCI signaling. The RS resource sets may correspond to the multiple reporting configurations. In some embodiments, the RS resource sets may be transmitted/sent in an order/sequence according to (or based on) the timing parameter. In some embodiments, the timing parameter may comprise a list of time parameters. Each time parameter of the list may correspond to one of the multiple reporting configurations, the corresponding RS resources, and/or the corresponding RS resource sets. In some embodiments, the RS (e.g., CSI-RS) may correspond to a plurality of transmission occasions. A time unit of each of the plurality of transmission occasions may be determined/configured according to (or by using) the timing parameter. The timing parameter may comprise a first time stamp, a first time unit index, a first time-domain period, a first time-domain interval, and/or a first time-domain offset. In some embodiments, the RS (e.g., CSI-RS) may correspond to a plurality of transmissions of channel state information. A time unit of each of the plurality of transmissions may be determined/configured according to (or based on) the timing parameter. The timing parameter may comprise a second time stamp, a second time unit index, a second time-domain period, a second time-domain interval, and/or a second time-domain offset. In some embodiments, a list of one or more beam states for each RS resource in a RS resource set for each of the transmission occasions may be configured/determined by the wireless communication node.

In some embodiments, the transmission parameter may comprise a beam state. The signaling and/or another signaling may indicate/provide/specify the beam state. A time unit of the beam state may be determined/configured according to (or based on) the timing parameter. In some embodiments, the timing parameter may include a time stamp associated/related with the beam state. The time stamp may be activated/enabled by a MAC-CE and/or DCI signaling. In some embodiments, the beam state may be applied to at least one of a downlink signal and/or an uplink signal. The beam state may be determined/configured according to (or based on) a prediction model. In some embodiments, the transmission parameter may comprise a list of beam states. The signaling may indicate/provide/specify the list of beam states, each applied in an order or a cyclic sequence. The signaling may indicate/provide/specify a first beam state to be applied from the list of beam states, a scaling factor of the timing parameter, and/or a timing parameter corresponding to a specific beam state from the list of beam states. In some embodiments, the beam states may comprise X beam states. In some embodiments, beam state (i mod X) and beam state ((i+1) mod X) of the X beam states may have a time interval between them (e.g., a time interval between beam state (i mod X) and beam state ((i+1) mod X)). The parameter X may be an integer. The parameter I may be an integer. Once a time domain interval for beam state (i mod X) is passed, a beam state comprising beam state ((i+1) mod X) may be applied. In some embodiments, the beam state may comprise a TCI state, a QCL state, spatial relation information, a RS, a spatial filter and/or pre-coding information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a first signaling to configure a plurality of parameter sets, each of the plurality of parameter sets associated with a respective timing parameter and a respective beam state;

receiving, by the wireless communication device from the wireless communication node, a second signaling to associate one or more information elements with at least one parameter set of the plurality of parameter sets; and communicating, by the wireless communication device, the one or more information elements according to a timing parameter and a beam state of the at least one parameter set, wherein the beam state of the at least one parameter set is applied to the one or more information elements according to the timing parameter.

2. The method of claim 1, wherein the one or more information elements comprise a physical downlink control channel (PDCCH), a physical downlink shared channel (PDSCH), a physical uplink control channel (PUCCH), a physical uplink shared channel (PUSCH), or a reference signal (RS).

3. The method of claim 1, wherein the first signaling comprises a radio resource control (RRC) signaling, a downlink control information (DCI) signaling, or a medium access control control element (MAC CE) signaling.

4. The method of claim 1, wherein the beam state comprises at least one of: group information, a repetition parameter, a transmission period, a transmission offset, or an uplink (UL) power control parameter.

5. The method of claim 1, wherein the timing parameter is used to determine a time unit, an effective time, a starting time or an ending time for applying the beam state.

6. The method of claim 1, wherein the timing parameter and a corresponding scaling factor are used to determine a time unit, an effective time, a starting time or an ending time for applying the beam state.

7. The method of claim 6, wherein the timing parameter and the corresponding scaling factor are indicated by the signaling or another signaling, and wherein the another signaling comprises a radio resource control (RRC) signaling, a downlink control information (DCI) signaling, or a medium access control control element (MAC CE) signaling.

8. The method of claim 6, wherein the time unit, effective time, starting time or ending time is determined according to a function of the timing parameter multiplied by the corresponding scaling factor, wherein the function comprises at least one of a ceil, floor, or round function.

9. The method of claim 1, wherein the timing parameter comprises at least one of: a time stamp, a time unit index, a time-domain period, a time-domain interval, or a time-domain offset.

10. The method of claim 9, wherein the time-domain offset comprises at least one of: a time-domain offset for a starting time, or a time-domain offset for an ending time.

11. The method of claim 1, wherein:

the timing parameter comprises a list of timing parameters, and the beam state comprises a list of beam states, and a mapping between two adjacent or associated beam states in the list of beam states, and a timing parameter from the list of timing parameters, is determined.

12. The method of claim 1, wherein:

the beam state comprises a list of beam states, and each beam state in the list of beam states is applied to a respective one of the one or more information elements in an order according to the timing parameter.

13. The method of claim 1, wherein:

a different timing parameter is associated with each of the one or more information elements.

14. The method of claim 1, wherein the timing parameter comprises a list of time-domain intervals, and the beam state comprises a list of beam states, and each beam state in the list of beam states is applied to a respective one of the plurality of information elements in an order according to the list of time-domain intervals and a corresponding scaling factor.

15. The method of claim 1, wherein at least one of:

the timing parameter comprises a time-domain period and a time-domain offset, the beam state comprises a list of beam states, or each beam state in the list of beam states is applied to the information element in an order according to the time-domain period and time-domain offset.

16. The method of claim 15, wherein the time-domain period and the time-domain offset are joint coded in a single parameter.

17. A wireless communication device comprising:

at least one processor configured to:

receive, via a transceiver from a wireless communication node, a first signaling to configure a plurality of parameter sets, each of the plurality of parameter sets associated with a respective timing parameter with a respective beam state;

receive, via the transceiver from the wireless communication node, a second signaling to associate one or more information elements with at least one parameter set of the plurality of parameter sets; and communicate, via the transceiver, the one or more information elements according to a timing parameter and a beam state of the at least one parameter set, wherein the beam state of the at least one parameter set is applied to the one or more information elements according to the timing parameter.

18. A wireless communication node comprising:

at least one processor configured to:

transmit, via a transmitter to a wireless communication device, a first signaling to configure a plurality of parameter sets, each of the plurality of parameter sets associated with a respective timing parameter with a respective beam state;

transmit, via the transmitter to the wireless communication device, a second signaling to associate one or more information elements with at least one parameter set of the plurality of parameter sets; and cause the wireless communication device to communicate the one or more information elements according to a timing parameter and a beam state of the at least one parameter set, wherein the beam state of the at least one parameter set is applied to the one or more information elements according to the timing parameter.

19. A method comprising:

transmitting, by a wireless communication node to a wireless communication device, a first signaling to configure a plurality of parameter sets, each of the plurality of parameter sets associated with a respective timing parameter with a respective beam state;

transmitting, by the wireless communication node to the wireless communication device, a second signaling to associate one or more information elements with at least one parameter set of the plurality of parameter sets; and causing the wireless communication device to communicate the one or more information elements according to a timing parameter and a beam state of the at least one parameter set, wherein the beam state of the at least one parameter set is applied to the one or more information elements according to the timing parameter.

* * * * *